(12) United States Patent
Fujiwara et al.

(10) Patent No.: US 11,975,228 B2
(45) Date of Patent: May 7, 2024

(54) FIRE DETECTION APPARATUS

(71) Applicant: HOCHIKI Corporation, Shinagawa-ku (JP)

(72) Inventors: Yasuharu Fujiwara, Shinagawa-ku (JP); Isao Saeki, Shinagawa-ku (JP); Hideki Takano, Shinagawa-ku (JP)

(73) Assignee: HOCHIKI Corporation, Tokyo (JP)

( * ) Notice: Subject to any disclaimer, the term of this patent is extended or adjusted under 35 U.S.C. 154(b) by 886 days.

(21) Appl. No.: 17/033,714

(22) Filed: Sep. 26, 2020

(65) Prior Publication Data
US 2021/0046346 A1 Feb. 18, 2021

Related U.S. Application Data

(63) Continuation-in-part of application No. PCT/JP2019/012780, filed on Mar. 26, 2019.

(30) Foreign Application Priority Data

| Mar. 28, 2018 | (JP) | ................................. 2018-062681 |
| Aug. 31, 2018 | (JP) | ................................. 2018-162772 |
| Sep. 18, 2018 | (JP) | ................................. 2018-173389 |

(51) Int. Cl.
*G01J 5/00* (2022.01)
*A62C 37/36* (2006.01)
(Continued)

(52) U.S. Cl.
CPC ............ *A62C 37/04* (2013.01); *G01J 5/0014* (2013.01); *G01J 5/048* (2013.01); *G01N 21/53* (2013.01)

(58) Field of Classification Search
CPC ................................ G01J 5/0014; G01J 5/048
See application file for complete search history.

(56) References Cited

U.S. PATENT DOCUMENTS

| 8,106,784 B2 | 1/2012 | Katou |
| 2010/0073172 A1* | 3/2010 | Lax .......................... G08B 17/10 340/630 |

(Continued)

FOREIGN PATENT DOCUMENTS

| CN | 1314664 | 9/2001 |
| CN | 101551931 A | 10/2009 |

(Continued)

OTHER PUBLICATIONS

Written Opinion of PCT/JP2019/012780.
(Continued)

*Primary Examiner* — Hoi C Lau
(74) *Attorney, Agent, or Firm* — Blank Rome LLP

(57) ABSTRACT

A fire detection apparatus 1A includes a heat detection unit 110A provided such that a part of the heat detection unit 110A is accommodated in an outer cover 20A and another part of the heat detection unit 110A is exposed to an outside of the fire detection apparatus 1A through an insertion hole 120A formed in a top surface portion 22A, and a guard portion 130A which is provided to cover a periphery of the insertion hole 120A and another part of the heat detection unit 110A in the top surface portion 22A and has a plurality of ribs, in which a material of a rib corresponding to a first guard side rib 131A among the plurality of ribs is made different from a material of some other ribs, or a shape of the first guard side rib 131A among the plurality of ribs is made different from a shape of some other ribs.

6 Claims, 10 Drawing Sheets

(51) Int. Cl.
*G01J 5/04* (2006.01)
*G01N 21/53* (2006.01)

(56) References Cited

U.S. PATENT DOCUMENTS

| | | | | |
|---|---|---|---|---|
| 2012/0072147 A1* | 3/2012 | Lee | ............ | F23N 5/242 |
| | | | | 702/75 |
| 2012/0229283 A1* | 9/2012 | McKenna | ............ | G08B 29/183 |
| | | | | 340/584 |
| 2012/0235822 A1* | 9/2012 | Barson | ............ | G08B 17/113 |
| | | | | 340/630 |
| 2019/0180590 A1* | 6/2019 | Fischer | ............ | G08B 29/183 |
| 2021/0046346 A1* | 2/2021 | Fujiwara | ............ | G08B 17/113 |

FOREIGN PATENT DOCUMENTS

| | | |
|---|---|---|
| EP | 1146492 | 10/2001 |
| EP | 2 908 301 A1 | 8/2015 |
| JP | H8-287374 | 11/1996 |
| JP | H9-016869 | 1/1997 |
| JP | 2001-266265 | 9/2001 |
| JP | 2001266265 A * 9/2001 ........... G08B 17/107 |
| JP | 2011-154544 | 8/2011 |
| JP | 2012-198757 | 10/2012 |
| JP | 2014-086013 | 5/2014 |
| JP | 2014086013 A * 5/2014 |
| JP | 2014-199632 | 10/2014 |
| JP | 2015-069484 | 4/2015 |
| TW | I235965 B | 7/2005 |
| WO | 2011089879 A1 | 7/2011 |

OTHER PUBLICATIONS

Taiwanese Office Action for corresponding Taiwanese Application No. 108110811 dated Dec. 2, 2022.
International Search Report of PCT/JP2019/012780.

* cited by examiner (a)

(b)

(a)

(b)

FIRE DETECTION APPARATUS

CROSS REFERENCE TO RELATED APPLICATIONS

This application is a continuation-in-part of International Application No. PCT/JP2019/012780, filed Mar. 26, 2019, which claims priority to Japanese Application No. 2018-062681, filed Mar. 28, 2018, Japanese Application No. 2018-162772, filed Aug. 31, 2018 and Japanese Application No. 2018-173389, filed Sep. 18, 2018. The entire contents of each of those applications are incorporated herein by reference.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The present invention relates to a fire detection apparatus.

BACKGROUND ART

Conventionally, a fire detector for detecting a fire in a monitored area has been known (for example, see Patent Document 1 to Patent Document 3).

Specifically, with regard to a fire detector of Patent Document 1, a technology for protecting a temperature detection element has been proposed. In this technology, a heat detector is configured to include the temperature detection element, a detector body for accommodating the temperature detection element, an insertion hole provided in a lower surface of the detector body to expose only a part of the temperature detection element to the outside of the detector body, and a protector which is provided on the lower surface of the detector body, has a plurality of ribs formed in the same shape, and is used to cover the temperature detection element exposed to the outside. In addition, a display hole for visually recognizing an indicator light accommodated in the detector body from the outside is provided in a portion other than a portion of the lower surface of the detector body corresponding to the protector (for example, see Patent Document 1).

In addition, with regard to a fire detector of Patent Document 2, a technology capable of detecting heat and carbon monoxide has been proposed. In this technology, a detector is configured to include a carbon monoxide detection unit accommodated in a housing to detect carbon monoxide in a detection space located inside the housing (hereinafter referred to as a "first detection space"), and a heat detection unit accommodated in the housing to detect heat in a detection space located outside the housing (hereinafter referred to as a "second detection space"). In addition, the housing is provided with an inlet for allowing gas containing carbon monoxide to flow into the first detection space, and an insertion hole for inserting a part of the heat detection unit into the second detection space (for example, see Patent Document 2).

In addition, with regard to a fire detector of Patent Document 3, a technology capable of detecting heat and smoke has been proposed. In this technology, a detector is configured to include a base for storing a substrate on which a smoke detection element and a heat detection element are disposed, a structure coupled to the base, and a structure cap coupled to the structure. In addition, this detector is provided with a space which is surrounded by the base, the structure, and the structure cap and in which smoke is detected by the smoke detection element inserted into the space (hereinafter referred to as a "first detection space"), a space which is located on the outer side of the first detection space, is surrounded by the base and the structure cap, and allows gas containing smoke to flow into the first detection space (hereinafter referred to as an "inflow space"), and a space which is located inside the inflow space and in which heat is detected by the heat detection element inserted into the space (hereinafter referred to as a "second detection space") (for example, see Patent Document 3).

CITATION LIST

Patent Document

Patent Document 1: Laid-open Patent Application Publication in Japan No. 2012-198757
Patent Document 2: Laid-open Patent Application Publication in Japan No 0.2014-199632
Patent Document 3: Laid-open Patent Application Publication in Japan No. Heisei 9-16869

SUMMARY OF THE INVENTION

Technical Problem

However, in the fire detectors of Patent Document 1 to Patent Document 3, first to third problems shown below occur.

First, with regard to the first problem, in the fire detector of Patent Document 1, since the protector and the display hole are provided to be exposed to the outside on the lower surface of the detector body, both the protector and the display hole are conspicuous from the outside, and thus there is concern that a design property of the heat detector may be degraded. In addition, since the shapes of the plurality of ribs of the protector are the same, for example, it is difficult to make an inflow of an air flow flowing into the protector from each direction uniform in accordance with an installation state of the heat detector, and thus there is a possibility that it may be difficult to improve an inflow property of the air flow. Therefore, there is room for improvement from a viewpoint of the design property or the inflow property of the air flow.

In addition, with regard to the second problem, in the fire detector of Patent Document 2, as described above, since the inlet and the insertion hole are provided in the housing, for example, gas flowing into the first detection space through the inlet (specifically, gas containing a first detection target such as carbon monoxide) flows out to the second detection space through the insertion hole. Thus, it is difficult to accurately detect the second detection target such as heat due to the gas that has flowed out. Therefore, there is room for improvement from a viewpoint of maintaining detection accuracy of the second detection target.

In addition, with regard to the third problem, in the fire detector of Patent Document 3, as described above, since the second detection space is located inside the inflow space, gas containing a first detection target such as smoke is likely to flow into the second detection space. Thus, it is difficult to accurately detect a second detection target such as heat due to the gas that has flowed in. Therefore, there is room for improvement from a viewpoint of maintaining or improving detection accuracy of the second detection target.

It is an object of the present invention to solve the problems of the above mentioned prior arts.

One aspect of the present invention provides a fire detection apparatus comprises a housing; and a unit that detects the fire on an inside of the housing.

BRIEF DESCRIPTION OF THE DRAWINGS

FIG. 6 is a diagram illustrating the fire detection apparatus in a state of removing an attachment base, in which FIG. 6(a) is a plan view and FIG. 6(b) is a bottom view.

FIG. 8 is a diagram illustrating an inner cover, in which FIG. 8(a) is a plan view and FIG. 8(b) is a bottom view.

FIG. 10 is a diagram illustrating the fire detection apparatus in a state of removing an attachment base, in which FIG. 10(a) is a plan view and FIG. 10(b) is a bottom view.

MODE FOR CARRYING OUT THE INVENTION

Figure 1:
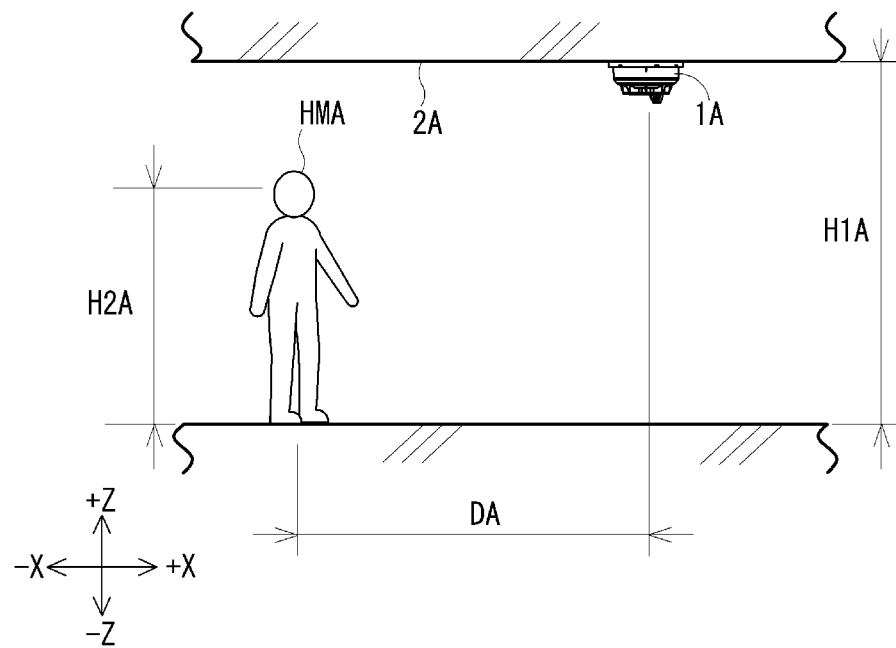
FIG. 1 is a side view illustrating an attachment state of a fire detection apparatus according to Embodiment 1.

Hereinafter, embodiments of a fire detection apparatus according to the invention will be described in detail with reference to drawings. First, [I] basic concepts of the embodiments will be described, and then [II] specific contents of the embodiments will be described. Finally, [III] modifications to the embodiments will be described. However, the invention is not limited by the embodiments.

[I] BASIC CONCEPTS OF EMBODIMENTS

First, the basic concepts of Embodiment 1 to Embodiment 3 will be described.

Basic Concept of Embodiment 1

First, the basic concept of Embodiment 1 will be described. Embodiment 1 (mode corresponding to Problem 1) is generally a fire detection apparatus attached to an installation surface of an installation object, and relates to a fire detection apparatus for detecting a fire in a monitored area.

Here, in Embodiment 1, the "fire detection apparatus" is an apparatus that thermally detects and reports a fire in the monitored area, and is a concept including, for example, a thermal fire detector or fire alarm, a thermal and optical fire detector or fire alarm, etc. In addition, the "installation object" is an object on which the fire detection apparatus is installed, and is a concept including, for example, a ceiling portion or a wall portion of a building. In addition, a specific structure or type of the "building" is arbitrary. For example, the "building" is a concept including, for example, a detached house, a complex building such as a row house or an apartment, an office building, an event facility, a commercial facility, a public facility, etc. In addition, the "monitored area" is an area to be monitored and is a concept including, for example, an area inside the building, an area outside the building, etc. In addition, "reporting" is a concept including, for example, outputting predetermined information to an external apparatus, displaying predetermined information or outputting the predetermined information as a sound via an output unit (a display unit or a sound output unit), etc. Hereinafter, in Embodiment 1, a description will be given of a case where the "fire detection apparatus" corresponds to the "thermal and optical fire detector", the "installation object" corresponds to the "ceiling portion of the office building", and the "monitored area" corresponds to the "area inside the office building".

Basic Concept of Embodiment 2

Next, the basic concept of Embodiment 2 will be described. Embodiment 2 (mode corresponding to Problem 2) generally relates to a fire detection apparatus for detecting a fire in the monitored area.

Here, in Embodiment 2, the "fire detection apparatus" is an apparatus that detects and reports a fire in the monitored area on the basis of detection results of a plurality of detection targets, and is a concept including, for example, a thermal and electrical fire detector or fire alarm, a thermal and optical fire detector or fire alarm, a thermal, electrical, and optical fire detector or fire alarm, etc. In addition, the "monitored area" is an area to be monitored and is a concept including, for example, an area inside the building, an area outside the building, etc. In addition, a specific structure or type of the "building" is arbitrary. For example, the "building" is a concept including a detached house, a complex building such as a row house or an apartment, an office building, an event facility, a commercial facility, a public facility, etc. In addition, "reporting" is a concept including, for example, outputting predetermined information to an external apparatus, displaying predetermined information or outputting the predetermined information as a sound via an output unit (a display unit or a sound output unit), etc. Hereinafter, in Embodiment 2, a description will be given of a case where the "fire detection apparatus" corresponds to the "thermal, electrical, and optical fire detector", and the "monitored area" corresponds to the "area inside the office building".

Basic Concept of Embodiment 3

Next, the basic concept of Embodiment 3 will be described. Embodiment 3 (mode corresponding to Problem 3) generally relates to a fire detection apparatus for detecting a fire in the monitored area.

Here, in Embodiment 3, the "fire detection apparatus" is an apparatus that detects and reports a fire in the monitored area on the basis of detection results of a plurality of detection targets, and is a concept including, for example, a thermal and electrical fire detector or fire alarm, a thermal and optical fire detector or fire alarm, a thermal, electrical, and optical fire detector or fire alarm, etc. In addition, the "monitored area" is an area to be monitored and is a concept including, for example, an area inside the building, an area outside the building, etc. In addition, a specific structure or type of the "building" is arbitrary. For example, the "building" is a concept including a detached house, a complex building such as a row house or an apartment, an office building, an event facility, a commercial facility, a public facility, etc. In addition, "reporting" is a concept including, for example, outputting predetermined information to an external apparatus, displaying predetermined information or outputting the predetermined information as a sound via an output unit (a display unit or a sound output unit), etc. Hereinafter, in Embodiment 3, a description will be given of a case where the "fire detection apparatus" corresponds to the "thermal and optical fire detector", and the "monitored area" corresponds to the "area inside the office building".

[II] SPECIFIC CONTENTS OF EMBODIMENTS

Next, specific contents of the embodiments will be described.

Embodiment 1

First, the fire detection apparatus according to Embodiment 1 will be described. Embodiment 1 corresponds to a mode in which a material of some of a plurality of ribs described below is made different from a material of some other ribs.

(Configuration)

Figure 2:
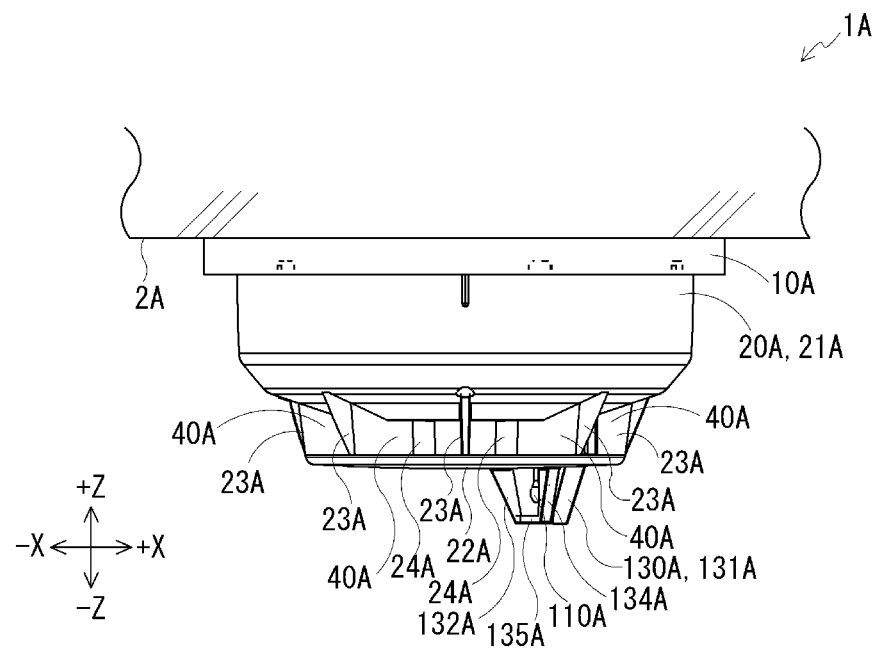
FIG. 2 is an enlarged view of an area of the fire detection apparatus of FIG. 1.
Figure 3:
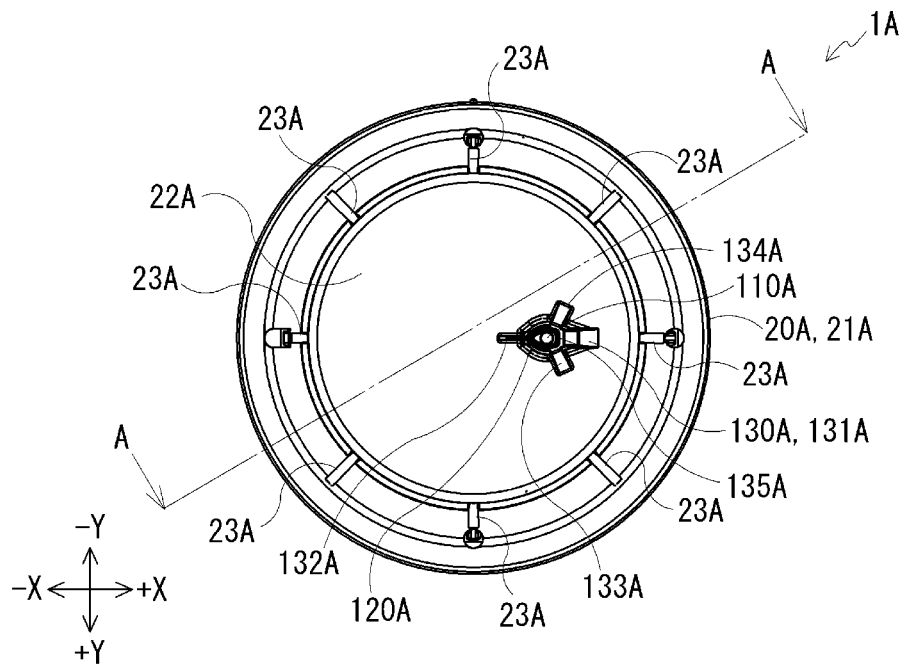
FIG. 3 is a bottom view illustrating the fire detection apparatus in a state of removing an attachment base.
Figure 4:
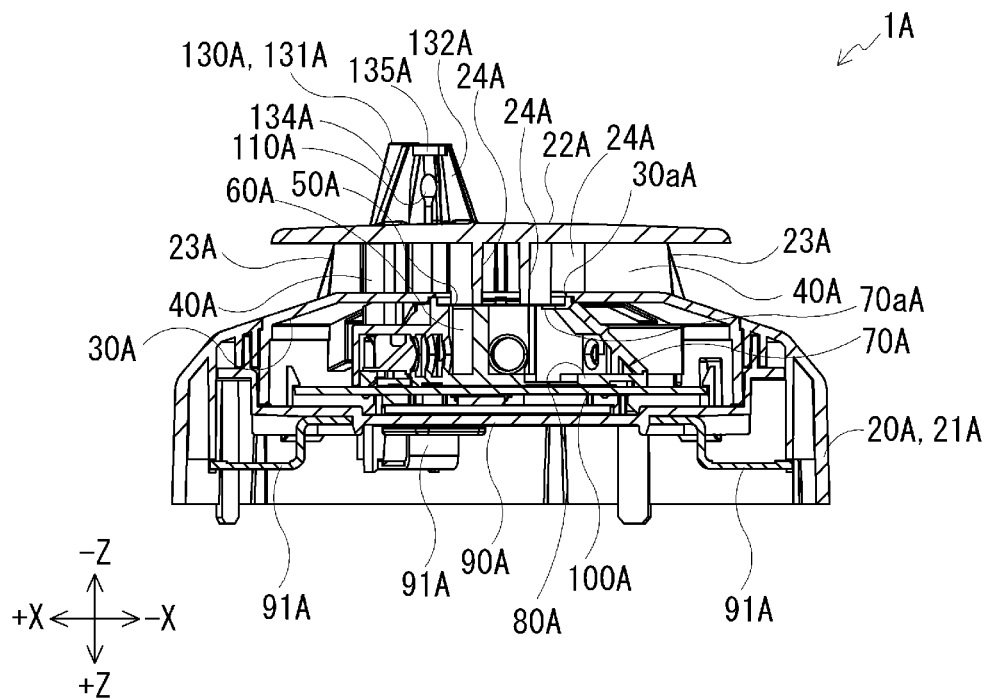
FIG. 4 is a cross-sectional view taken along A-A line of FIG. 3.

First, a description will be given of a configuration of the fire detection apparatus according to Embodiment 1. FIG. 1 is a side view illustrating an attachment state of the fire detection apparatus according to Embodiment 1. FIG. 2 is an enlarged view of an area of the fire detection apparatus of FIG. 1. FIG. 3 is a bottom view illustrating the fire detection apparatus in a state of removing an attachment base described below. FIG. 4 is a cross-sectional view taken along A-A line of FIG. 3. In the following description, an X direction of FIG. 1 is referred to as a left-right direction of the fire detection apparatus (a +X direction is a left direction of the fire detection apparatus and a −X direction is a right direction of the fire detection apparatus), a Y direction of FIG. 3 is referred to as a front-back direction of the fire detection apparatus (a +Y direction is a frontward direction of the fire detection apparatus and a −Y direction is a backward direction of the fire detection apparatus), and a Z direction of FIG. 1 is referred to as a vertical direction of the fire detection apparatus (a +Z direction is an upward direction of the fire detection apparatus and a −Z direction is a downward direction of the fire detection apparatus). In addition, with reference to a center position of the detection space of FIG. 3, a direction away from the detection space is referred to as an "outer side", and a direction approaching the detection space is referred to as an "inner side".

The fire detection apparatus 1A is an apparatus that detects heat in the monitored area, and detects and reports a substance to be detected (for example, smoke, etc.) contained in gas. The fire detection apparatus 1A is installed on an installation surface 2A on a lower surface of a ceiling portion (installation object) of a building in an interior of the building, and includes an attachment base 10A, an outer cover 20A, an inner cover 30A, an inflow space 40A, an insect screen 50A, a detection space 60A, a detector cover 70A, a detector body 80A, a terminal board 90A, and a substrate 100A as illustrated in FIG. 1 to FIG. 4.

(Configuration—Attachment Base)

Returning to FIG. 1, the attachment base 10A is an attaching unit that attaches the outer cover 20A to the installation surface 2A. The attachment base 10A is configured using, for example, a known attachment base for the fire detection apparatus (as an example, a substantially plate-shaped attachment base made of resin), etc., and is fixed to the installation surface 2A by a fixing tool, etc. as illustrated in FIG. 2 and FIG. 3.

(Configuration—Outer Cover)

Returning to FIG. 2, the outer cover 20A is a cover that covers the inner cover 30A, the inflow space 40A, the insect screen 50A, the detection space 60A, the detector cover 70A, the detector body 80A, the terminal board 90A, and the substrate 100A. The outer cover 20A is formed of, for example, a resin material having a light shielding property, and includes an outer cover body 21A, a top surface portion 22A, a first rib portion 23A, and a second rib portion 24A as illustrated in FIG. 2 to FIG. 4.

Among these portions, the outer cover body 21A is a basic structure of the outer cover 20A. The outer cover body 21A is formed of, for example, a substantially hollow cylindrical body whose upper surface and lower surface are open, is disposed so that an upper end portion of the outer cover body 21A comes into contact with a lower surface of the attachment base 10A as illustrated in FIG. 2, and is fixed to the attachment base 10A by a fitting structure (or a fixing tool), etc.

In addition, the top surface portion 22A is a partition unit that partitions the inflow space 40A. The top surface portion 22A is formed of, for example, a substantially circular plate-shaped body, and is provided substantially horizontally below the outer cover body 21A as illustrated in FIG. 2 to FIG. 4.

In addition, the first rib portion 23A is a partition unit that partitions the inflow space 40A. The first rib portion 23A is formed from a substantially plate-shaped body, and is provided vertically between the outer cover body 21A and the top surface portion 22A. Specifically, as illustrated in FIG. 2 and FIG. 4, a plurality of first rib portions 23A is provided radially from the vicinity of a center of the outer cover 20A, and is connected to the outer cover body 21A and the top surface portion 22A.

In addition, the second rib portion 24A is a partition unit that partitions the inflow space 40A. The second rib portion 24A is formed from a substantially plate-shaped body, and is provided vertically between the outer cover body 21A and the top surface portion 22A. Specifically, as illustrated in FIG. 2 and FIG. 4, a plurality of second rib portions 24A is provided between inner end portions of adjacent first rib portions 23A, and is connected to the outer cover body 21A and the top surface portion 22A. Details of a configuration of the outer cover 20A will be described below. In addition, the "outer cover 20A" corresponds to a "housing" in claims.

(Configuration—Inflow Space)

Returning to FIG. 2, the inflow space 40A is a space for allowing gas outside the fire detection apparatus 1A to flow into the fire detection apparatus 1A. A plurality of inflow spaces 40A is formed inside the outer cover 20A. Specifically, as illustrated in FIG. 2 and FIG. 4, a space surrounded by the top surface portion 22A, the first rib portion 23A, the second rib portion 24A, and the inner cover 30A in an internal space of the outer cover 20A is formed as the inflow space 40A.

(Configuration—Inner Cover)

The inner cover 30A is a cover that covers the detection space 60A, the detector cover 70A, the detector body 80A, and the substrate 100A, and is a partition unit that partitions the inflow space 40A. The inner cover 30A is, for example, a substantially hollow cylindrical body whose upper surface is open, is formed of a resin material having a light shielding property, and is provided so that a lower surface of the inner cover 30A faces the top surface portion 22A of the outer cover 20A through the inflow space 40A on the inside of the outer cover 20A as illustrated in FIG. 4. In addition, as illustrated in FIG. 4, a first opening 30*a*A is formed in the lower surface of the inner cover 30A. The first opening 30*a*A is an opening for sending gas flowing into the inflow space 40A to the detection space 60A, and is provided at a substantially central portion and the vicinity thereof in the lower surface of the inner cover 30A as illustrated in FIG. 4.

(Configuration—Detection Space)

The detection space 60A is a space for detecting a substance to be detected. As illustrated in FIG. 4, a space surrounded by the detector cover 70A and the detector body 80A in an internal space of the inner cover 30A is formed as the detection space 60A.

(Configuration—Detector Cover)

The detector cover 70A is a partition unit that partitions the detection space 60A, and is an incidence suppression unit that suppresses incidence of ambient light into the detection space 60A. The detector cover 70A is a substantially hollow cylindrical body whose upper surface is open, and is formed of a resin material having a light shielding property. In addition, as illustrated in FIG. 4, the detector cover 70A is disposed so that a lower surface of the detector cover 70A faces the top surface portion 22A of the outer cover 20A through the first opening 30*a*A and the inflow space 40A on the inside of the inner cover 30A, and is fixed to the detector body 80A by a fitting structure, etc. In addition, as illustrated in FIG. 4, a second opening 70*a*A is formed in the lower surface of the detector cover 70A. The second opening 70*a*A is an opening for allowing gas sent from the first opening 30*a*A to flow into the detection space 60A, and is provided at a portion corresponding to the first opening 30*a*A on the lower surface of the detector cover 70A as illustrated in FIG. 4.

(Configuration—Insect Screen)

The insect screen 50A is a net for preventing insects present outside the fire detection apparatus 1A from intruding into the detection space 60A. The insect screen 50A is configured using a mesh-like and circular net, and is attached to the detector cover 70A as illustrated in FIG. 4.

(Configuration—Detector Body)

The detector body 80A is an attaching unit that attaches the detector cover 70A, and is an incidence suppression unit that suppresses incidence of ambient light into the detection space 60A. The detector body 80A is formed of, for example, a resin material having a light shielding property, is disposed to cover an upper surface of the detector cover 70A as illustrated in FIG. 4, and is fixed to the substrate 100A by a fixing tool, etc. In addition, the detector body 80A is provided with a support (not illustrated) for supporting each of a first light emitting unit (described below), a second light emitting unit (described below), and a light receiving unit (described below). Furthermore, each optical path hole (not illustrated) for forming an optical path between the detection space 60A and each of the first light emitting unit (described below), the second light emitting unit (described below), and the light receiving unit (described below) is formed in the detector body 80A.

(Configuration—Terminal Board)

The terminal board 90A is an accommodation unit that accommodates the inner cover 30A, the detector cover 70A, the detector body 80A, and the substrate 100A. The terminal board 90A has a substantially hollow cylindrical shape whose lower surface is open, and is formed of, for example, a resin material having a light shielding property. In addition, as illustrated in FIG. 4, the terminal board 90A is provided to cover the inner cover 30A, the detector cover 70A, the detector body 80A, and the substrate 100A from above, is fixed to the outer cover 20A by a fitting structure, etc., and is fixed to the attachment base 10A by a fixing tool, etc. through a first attachment hole (not illustrated) formed in an attachment member 91A.

(Configuration—Substrate)

The substrate 100A is a mounting unit on which various electric circuits (not illustrated) are mounted. The substrate 100A is configured using, for example, a known flat plate-shaped circuit board, etc., is disposed substantially horizontally at a distance from an upper end portion and a lower end portion of the terminal board 90A in the terminal board 90A as illustrated in FIG. 4, and is fixed to the terminal board 90A by a fixing tool through an attachment hole (not illustrated) formed in the terminal board 90A and a second attachment hole (not illustrated) formed in the attachment member 91A.

Further, in addition to the fact that a known electronic component used for the conventional fire detection apparatus 1A is mounted on the substrate 100A, as illustrated in FIG. 4, the first light emitting unit (not illustrated), the second light emitting unit (not illustrated), the light receiving unit (not illustrated), a heat detection unit 110A, a display unit (not illustrated), a communication unit (not illustrated), a power supply unit (not illustrated), a control unit (not illustrated), and a storage unit (not illustrated) are mounted on the substrate 100A.

(Configuration—Substrate—First Light Emitting Unit, Second Light Emitting Unit, and Light Receiving Unit)

Among these units, the first light emitting unit is a first light emitting unit that irradiates the detection space 60A with detection light (hereinafter referred to as "first detection light"), and is configured using, for example, a known light emitting element (as an example, an infrared light emitting diode (LED), etc.). In addition, the second light emitting unit is a second light emitting unit that irradiates the detection space 60A with detection light (hereinafter referred to as "second detection light") having a different wavelength from that of the first detection light, and is configured using, for example, a known light emitting element (as an example, a blue LED, etc.). In addition, the light receiving unit is a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light, and is configured using, for example, a known light receiving element (as an example, a photodiode, etc.). In addition, a method of installing the first light emitting unit, the second light emitting unit, and the light receiving unit is arbitrary. In Embodiment 1, installation is performed to be able to avoid direct reception of the first detection light or the second detection light irradiated from the first light emitting unit or the second light emitting unit to the light receiving unit through various optical path holes of the detector body 80A. For example, the first light emitting unit and the light receiving unit are installed at a position at which an angle between an optical axis of the first light emitting unit (hereinafter referred to as a "first light emitting-side optical axis") and an optical axis of the light receiving unit (hereinafter referred to as a "light receiving-side optical axis") is about 135°. In addition, the second light emitting unit and the light receiving unit are installed at a position at which an angle between an optical axis of the second light emitting unit (hereinafter referred to as a "second light emitting-side optical axis") and the light receiving-side optical axis is about 90°.

(Configuration—Substrate—Heat Detection Unit, Display Unit, Communication Unit, and Power Supply Unit)

Returning to FIG. 2, in addition, the heat detection unit 110A is a heat detection unit that detects a fire. The heat detection unit 110A is configured using, for example, a known heat detection element (as an example, a thermistor, etc.), and is disposed so that a part of the heat detection unit 110A is exposed to the outside of the fire detection apparatus 1A through an insertion hole (not illustrated) provided in each of the inner cover 30A, the detector cover 70A, and the detector body 80A and an insertion hole 120A of the outer cover 20A described below as illustrated in FIG. 2 to FIG. 4. In addition, the display unit is a display unit that displays predetermined information (for example, information indicating the presence or absence of detection of a fire) by irradiating light (hereinafter referred to as "display light") to the outside of the fire detection apparatus 1A, and is configured using, for example, a known display unit (an LED, etc.). In addition, a light projection method of the display unit is arbitrary. Examples thereof include light projection by guiding display light from the display unit toward the outside of the fire detection apparatus 1A through a light guide 104aA inserted into an insertion hole (not illustrated) provided in each of the inner cover 30A, the detector cover 70A, and the detector body 80A and the insertion hole 120A of the outer cover 20A. In addition, the communication unit is a communication unit that communicates with an external apparatus (for example, a receiver, etc.). The power supply unit is a power supply unit that supplies power supplied from a commercial power supply or a battery (not illustrated) to each unit of the fire detection apparatus 1A.

(Configuration—Substrate—Control Unit and Storage Unit)

In addition, the control unit is a control unit that controls the fire detection apparatus 1A. Specifically, the control unit is a computer including a central processing unit (CPU) and an internal memory such as a random access memory (RAM) for storing various programs (including a basic control program such as the OS and an application program activated on the OS to realize a specific function) to be interpreted and executed on the CPU, a program, and various data. In addition, the storage unit is a storage unit that stores programs and various data necessary for an operation of the fire detection apparatus 1A. The storage unit is configured using a rewritable recording medium. For example, it is possible to use a non-volatile recording medium such as a flash memory.

(Configuration—Details of Configuration of Outer Cover)

Returning to FIG. 2, next, a description will be given of details of a configuration of the outer cover 20A. However, the outer cover 20A may be manufactured in an arbitrary shape using an arbitrary method and material, unless otherwise specified.

In Embodiment 1, as illustrated in FIG. 2 to FIG. 4, the insertion hole 120A and a guard portion 130A are provided in the top surface portion 22A which is a side portion on the opposite side from a side portion on the installation surface 2A side (opposite side portion) in side portions of the outer cover 20A.

(Configuration—Details of Configuration of Outer Cover—Insertion Hole)

Returning to FIG. 3, the insertion hole 120A is a through-hole for exposing a part of the heat detection unit 110A to the outside of the fire detection apparatus 1A and irradiating display light from the display unit to the outside of the fire detection apparatus 1A.

Here, a specific shape and size of the insertion hole 120A are arbitrary. In Embodiment 1, as illustrated in FIG. 3, a planar shape of the insertion hole 120A is set to a substantially elliptical shape (or may be a polygonal shape such as a quadrangular shape). In addition, a diameter of the insertion hole 120A is set to a size that allows only a part of the heat detection unit 110A to be exposed to the outside and allows display light to be irradiated to the outside of the fire detection apparatus 1A. For example, the diameter is set to be longer than a length obtained by adding a diameter of the heat detection unit 110A to a diameter of the light guide 104aA.

In addition, a method of forming the insertion hole 120A is arbitrary. The insertion hole 120A is formed in a portion other than a central portion of the top surface portion 22A. Specifically, as illustrated in FIG. 3, the insertion hole 120A is formed in a right side portion on the top surface portion 22A. In this case, for example, the heat detection unit 110A and the display unit may be installed in a portion corresponding to the insertion hole 120A or the vicinity thereof in a portion of the substrate 100A. According to such a formation method, when compared to a case in which the insertion hole 120A is formed in the central portion of the top surface portion 22A, there are few restrictions on attachment of the heat detection unit 110A and the display unit. Therefore, it is possible to maintain an attachment property of the heat detection unit 110A and the display unit.

A part of the heat detection unit 110A may be accommodated in the outer cover 20A by such an insertion hole 120A, another part of the heat detection unit 110A may be exposed to the outside of the fire detection apparatus 1A through the insertion hole 120A, and display light from the display unit may be irradiated to the outside of the fire detection apparatus 1A through the insertion hole 120A.

(Configuration—Details of Configuration of Outer Cover—Guard Portion)

Returning to FIG. 2, the guard portion 130A is a guard unit that protects the heat detection unit, and includes a first guard side rib 131A, a second guard side rib 132A, a third guard side rib 133A, a fourth guard side rib 134A, and a guard side connecting portion 135A as illustrated in FIG. 2 to FIG. 4.

(Configuration—Details of Configuration of Outer Cover—Guard Portion—First Guard Side Rib to Fourth Guard Side Rib)

Returning to FIG. 2, the first guard side rib 131A, the second guard side rib 132A, the third guard side rib 133A, and the fourth guard side rib 134A correspond to a basic structure of the guard portion 130A. Each of the first guard side rib 131A, the second guard side rib 132A, the third guard side rib 133A, and the fourth guard side rib 134A is formed of a long plate-shaped body, and is provided to cover the periphery of the insertion hole 120A and a portion of the heat detection unit 110A exposed to the outside of the fire detection apparatus 1A as illustrated in FIG. 2 to FIG. 4. Specifically, the first guard side rib 131A, the second guard side rib 132A, the third guard side rib 133A, and the fourth guard side rib 134A are provided such that a longitudinal direction thereof extends substantially along the vertical direction (is slightly inclined in FIG. 3), and are vertically arranged with respect to a lower surface of the top surface portion 22A.

(Configuration—Details of Configuration of Outer Cover—Guard Portion—Guard Side Connecting Portion)

Returning to FIG. 2, the guard side connecting portion 135A is a connecting unit that connects the first guard side rib 131A, the second guard side rib 132A, the third guard side rib 133A, and the fourth guard side rib 134A. The guard side connecting portion 135A is formed of, for example, the same material as that of the outer cover 20A, and is connected to the vicinity of upper end portions of the first guard side rib 131A, the second guard side rib 132A, the third guard side rib 133A, and the fourth guard side rib 134A as illustrated in FIG. 2 to FIG. 4.

According to such a configuration, it is possible to inhibit the insertion hole 120A from being exposed to the outside of the fire detection apparatus 1A by the guard portion 130A, and to maintain a design property of the fire detection apparatus 1A without impairing an inflow property of an air flow to the guard portion 130A.

(Configuration—Details of Configuration of Outer Cover—Guard Portion—Details of Configurations of First Guard Side Rib to Fourth Guard Side Rib)

Next, a description will be given of details of configurations of the first guard side rib 131A, the second guard side rib 132A, the third guard side rib 133A, and the fourth guard side rib 134A.

First, a material of each of the first guard side rib 131A, the second guard side rib 132A, the third guard side rib 133A, and the fourth guard side rib 134A is arbitrary. In Embodiment 1, a material of some ribs among the first guard side rib 131A, the second guard side rib 132A, the third guard side rib 133A, and the fourth guard side rib 134A is different from a material of some other ribs. Specifically, the first guard side rib 131A is formed of a translucent material (as an example, a translucent resin material, a glass material, etc.), and the second guard side rib 132A, the third guard side rib 133A, and the fourth guard side rib 134A are formed of the same material as that of the outer cover 20A.

According to such a configuration, by forming only the first guard side rib 131A using the translucent material, it is possible to guide display light irradiated from the display unit accommodated in the outer cover 20A to the outside of the fire detection apparatus 1A through the first guard side rib 131A and the insertion hole 120A. Therefore, since there is no need to provide the display hole for guiding display light to the outside in the outer cover 20A, it is possible to maintain the design property of the fire detection apparatus 1A when compared to a conventional technology (a technology in which the protector and the display hole are exposed to the outside).

In addition, specific configurations of the first guard side rib 131A, the second guard side rib 132A, the third guard side rib 133A, and the fourth guard side rib 134A are arbitrary. In Embodiment 1, the guard side ribs are configured such that display light irradiated from the display unit is guided to the outside of the fire detection apparatus 1A through the first guard side rib 131A. More specifically, the guard side ribs are configured such that display light can be visually recognized when a person looks up at the fire detection apparatus 1A under a predetermined condition. Here, the "predetermined condition" is arbitrary. In Embodiment 1, as illustrated in FIG. 1, the predetermined condition corresponds to the fact that the fire detection apparatus 1A is installed on the ceiling portion at a height H1A of the installation surface 2A (as an example, 2.4 m), a person HMA is present within a predetermined distance DA (as an example, within 3.0 m, etc.) from the fire detection apparatus 1A, and a height H2A of eyes of the person HMA is lower than the height H1A of the installation surface 2A (as an example, 1.8 m, etc.).

Specifically, first, the first guard side rib 131A, the second guard side rib 132A, the third guard side rib 133A, and the fourth guard side rib 134A are provided adjacent to the insertion hole 120A. More specifically, as illustrated in FIG. 3, the first guard side rib 131A is disposed on the right side of the insertion hole 120A, the second guard side rib 132A is disposed on the left side of the insertion hole 120A, the third guard side rib 133A is disposed on the front side and to the right of the insertion hole 120A, and the fourth guard side rib 134A is disposed on the back side and to the right of the insertion hole 120A.

According to such a configuration, the person can visually recognize the display light at the time of looking up at the fire detection apparatus 1A under the predetermined condition. Further, in particular, while ensuring the strength of the guard portion 130A, the first guard side rib 131A may be allowed to function as a light guide, and the display light can be easily visually recognized in various directions.

In addition, shapes of the first guard side rib 131A, the second guard side rib 132A, the third guard side rib 133A, and the fourth guard side rib 134A (specifically, forms of the ribs or sizes of the ribs) are arbitrary. In Embodiment 1, among the first guard side rib 131A, the second guard side rib 132A, the third guard side rib 133A, and the fourth guard side rib 134A, a shape of some of the ribs is different from a shape of some other ribs. Specifically, as illustrated in FIG. 2 and FIG. 4, vertical lengths of the first guard side rib 131A, the second guard side rib 132A, the third guard side rib 133A, and the fourth guard side rib 134A are set to be longer than a vertical length of a portion of the heat detection unit 11A exposed to the outside of the fire detection apparatus 1A. In addition, in Embodiment 1, widths of the first guard side rib 131A, the second guard side rib 132A, the third guard side rib 133A, and the fourth guard side rib 134A are set on the basis of an experimental result, etc. so that an air flow flowing in toward the guard portion 130A from each direction can be uniformized. As an example, as illustrated in FIG. 2 and FIG. 4, the widths may be set to be shorter than a diameter of the insertion hole 120A, and the width of the second guard side rib 132A may be set to be narrower than the widths of the other ribs. In addition, in Embodiment 1, thicknesses of the first guard side rib 131A, the second guard side rib 132A, the third guard side rib 133A, and the fourth guard side rib 134A are set on the basis of an inflow or an inflow direction of an air flow flowing into the guard portion 130A. For example, the thicknesses may be set on the basis of an experimental result, etc. so that the air flow flowing in toward the guard portion 130A from each direction can be uniformized. As an example, the thickness of the second guard side rib 132A may be set to be thinner than the thicknesses of the other ribs. In addition, the thicknesses of the third guard side rib 133A and the fourth guard side rib 134A may be set to be thicker than the thickness of the second guard side rib 132A. In addition, the thickness of the first guard side rib 131A may be set to be thicker than the thicknesses of the other ribs.

According to such a configuration, when compared to a case in which a plurality of ribs is formed in the same shape, it is easy to uniformize the inflow of the air flow flowing into the guard portion 130A from each direction in accordance with the installation state of the fire detection apparatus 1A. Therefore, it is possible to improve an inflow property of an air flow in the fire detection apparatus 1A. In addition, it is possible to set thicknesses of a plurality of ribs according to the inflow or the inflow direction of the air flow flowing into the guard portion 130A, and it is possible to ensure an inflow property of the air flow to the guard portion 130A while maintaining durability of the guard portion 130A. In addition, since the first guard side rib 131A is a rib thicker than a thinnest rib among the plurality of ribs (specifically, is a thickest rib), display light irradiated from the display unit is easily guided to the outside of the fire detection apparatus 1A while suppressing damage to the first guard side rib 131A, etc. Thus, it is possible to further maintain a display function of the fire detection apparatus 1A while improving durability of the first guard side rib 131A. In particular, the first guard side rib 131A is disposed at a position farthest from the central portion of the top surface portion 22A, and thus contributes to improvement of uniformization of the inflow of the air flow flowing in from each direction in the guard portion 130A, the design property of the fire detection apparatus 1A, and durability of the guard portion 130A by setting the thickness of the first guard side rib 131A as described above. In addition, since the second guard side rib 132A is a rib thinner than a thickest rib among the plurality of ribs (specifically, a thinnest rib) and is a rib narrower than a widest rib (specifically, a narrowest rib), when the insertion hole 120A is provided in a portion other than the central portion of the top surface portion 22A, it becomes easier to uniformize the inflow of the air flow flowing in from each direction in the guard portion 130A. Thus, it is possible to improve the inflow property of the air flow to the guard portion 130A.

A method of forming the guard portion 130A described above is arbitrary. In Embodiment 1, the first guard side rib 131A is formed separately from the second guard side rib 132A, the third guard side rib 133A, the fourth guard side rib 134A, and the guard side connecting portion 135A. Specifically, the first guard side rib 131A is formed by injection-molding a translucent resin material, and the outer cover 20A, the second guard side rib 132A, the third guard side rib 133A, the fourth guard side rib 134A, and the guard side connecting portion 135A are integrally formed by injection-molding a resin material having a light shielding property. Thereafter, the first guard side rib 131A is connected to the outer cover 20A and the guard side connecting portion 135A by a fitting structure, etc., thereby forming the guard portion 130A.

(With Regard to Action of Fire Detection Apparatus)

Next, a description will be given of an action of the fire detection apparatus 1A configured as described above.

That is, for example, in a state in which the fire detection apparatus 1A is attached to the installation surface 2A, the insertion hole 120A is covered by the guard portion 130A, and thus it is possible to inhibit the insertion hole 120A from being exposed to the outside of the fire detection apparatus 1A.

In addition, for example, when display light is irradiated from the display unit in the state in which the fire detection apparatus 1A is attached to the installation surface 2A, display light irradiated from the display unit is guided to the outside of the fire detection apparatus 1A through the first guard side rib 131A, and thus the first guard side rib 131A may be allowed to function as the light guide 104aA.

Effect of Embodiment 1

As described above, according to Embodiment 1, since the material of the first guard side rib 131A among the first guard side rib 131A to the fourth guard side rib 134A is made different from the material of some other ribs, for example, it is possible to guide light irradiated from the display unit accommodated in the outer cover 20A to the outside of the fire detection apparatus 1A through the first guard side rib 131A and the insertion hole 120A by forming only the first guard side rib 131A using the translucent material. Therefore, since there is no need to provide the display hole for guiding light irradiated from the display unit to the outside in the outer cover 20A, it is possible to maintain the design property of the fire detection apparatus 1A when compared to a conventional technology (a technology in which the protector and the display hole are exposed to the outside). In addition, since the shape of the first guard side rib 131A among the first guard side rib 131A to the fourth guard side rib 134A is made different from the shape of some other ribs, when compared to a case in which the first guard side rib 131A to the fourth guard side rib 134A are formed in the same shape, it is easy to uniformize the inflow of the air flow flowing into the guard portion 130A from each direction in accordance with the installation state of the fire detection apparatus 1A. Therefore, it is possible to improve the inflow property of the air flow in the fire detection apparatus 1A.

In addition, since only the first guard side rib 131A is formed of the translucent material, and the first guard side rib 131A to the fourth guard side rib 134A are configured such that light irradiated from the display unit is guided to the outside of the fire detection apparatus 1A through the first guard side rib 131A, the first guard side rib 131A may be allowed to function as the light guide 104aA while ensuring the strength of the guard portion 130A, and light irradiated from the display unit can be easily visually recognized in various directions.

In addition, since the thicknesses of the first guard side rib 131A to the fourth guard side rib 134A are set on the basis of the inflow or the inflow direction of the air flow flowing into the guard portion 130A, it is possible to set the thicknesses of the first guard side rib 131A to the fourth guard side rib 134A based on the inflow or the inflow direction of the air flow flowing into the guard portion 130A, and it is possible to ensure the inflow property of the air flow to the guard portion 130A while maintaining the durability of the guard portion 130A.

In addition, since the first guard side rib 131A is a rib thicker than a thinnest rib among the first guard side rib 131A to the fourth guard side rib 134A, light irradiated from the display unit is easily guided to the outside of the fire detection apparatus 1A while suppressing damage to the first guard side rib 131A, etc. Thus, it is possible to further maintain the display function of the fire detection apparatus 1A while improving durability of the first guard side rib 131A.

In addition, the insertion hole 120A is provided in a portion other than the central portion in a part of the top surface portion 22A. Thus, when compared to the case in which the insertion hole 120A is formed in the central portion of the top surface portion 22A, there are few restrictions on attachment of the heat detection unit 110A and the display unit. Therefore, it is possible to maintain an attachment property of the heat detection unit 110A and the display unit.

In addition, since the second guard side rib 132A is a rib thinner than a thickest rib and is a rib narrower than a widest rib among the first guard side rib 131A to the fourth guard side rib 134A, when the insertion hole 120A is provided in a portion other than the central portion of the top surface portion 22A, it becomes easier to uniformize the inflow of the air flow flowing in from each direction in the guard portion 130A. Thus, it is possible to improve the inflow property of the air flow to the guard portion 130A.

Embodiment 2

Next, a fire detection apparatus according to Embodiment 2 will be described. Embodiment 2 corresponds to a mode in which a partition wall described below is provided in a housing.

(Configuration)

Figure 5:
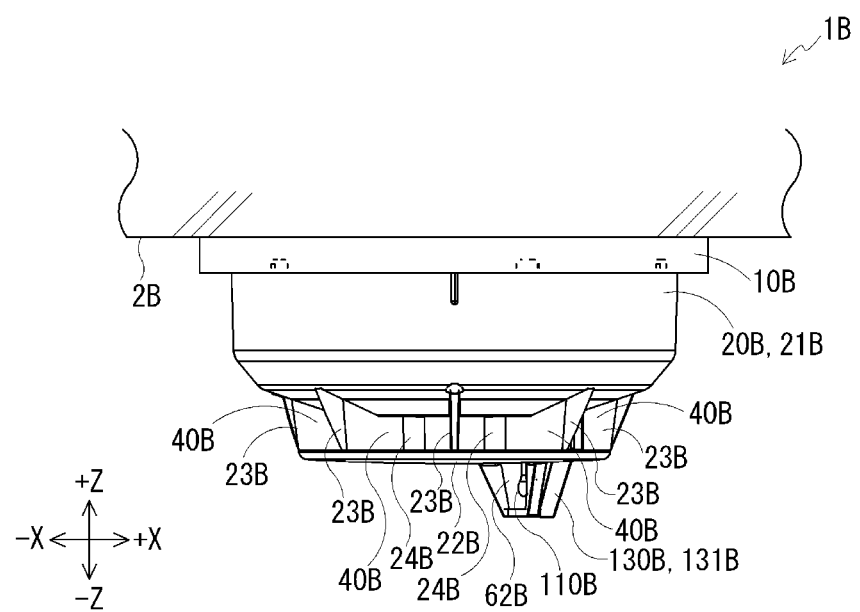
FIG. 5 is a side view illustrating an attachment state of a fire detection apparatus according to Embodiment 2.
Figure 6:
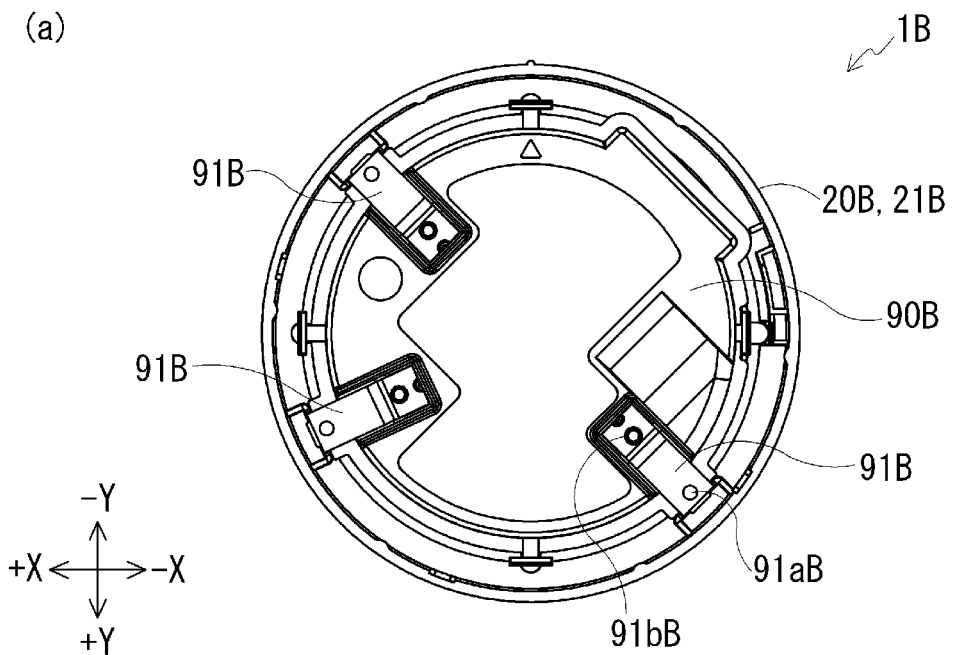
Figure 6:
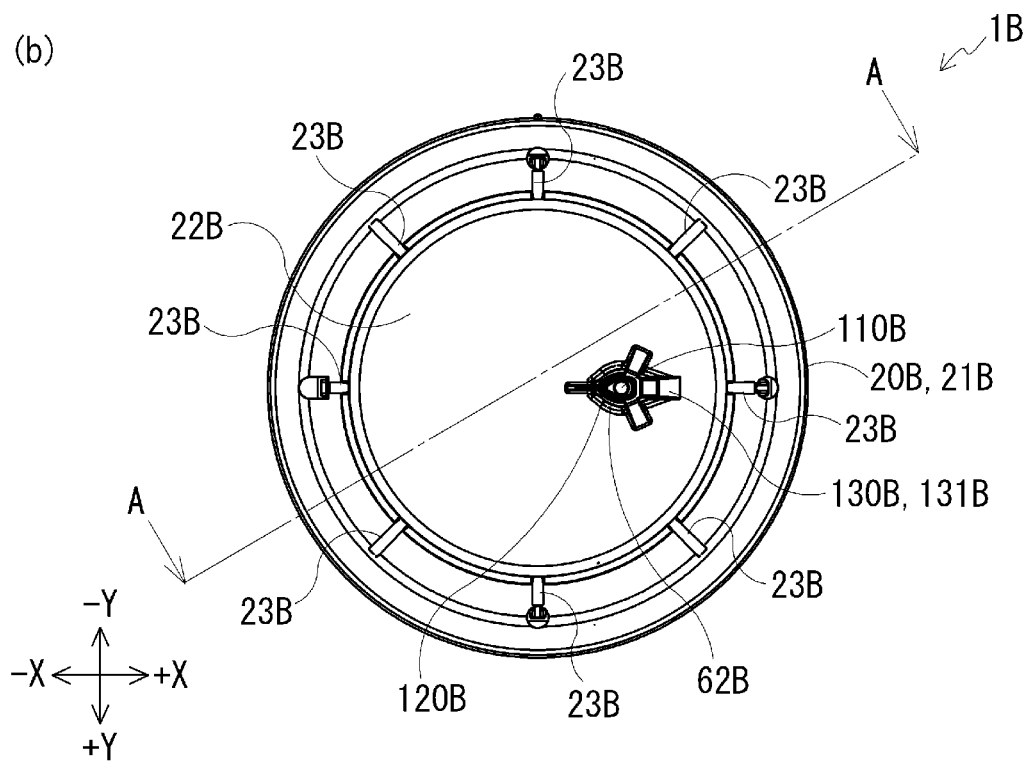
Figure 7:
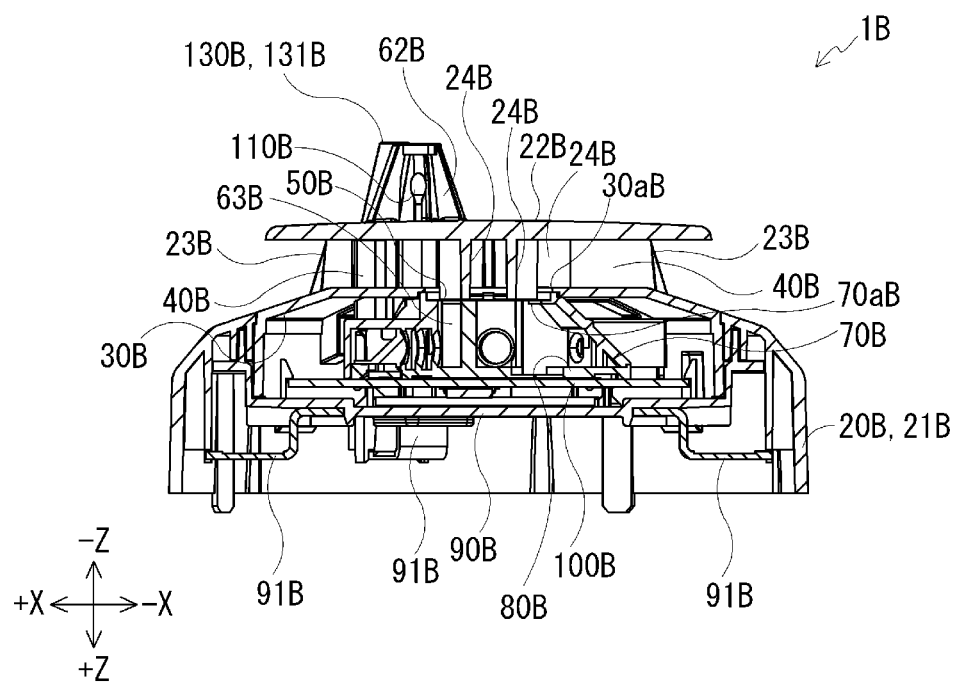
FIG. 7 is a cross-sectional view taken along A-A line of FIG. 6(b).
Figure 8:
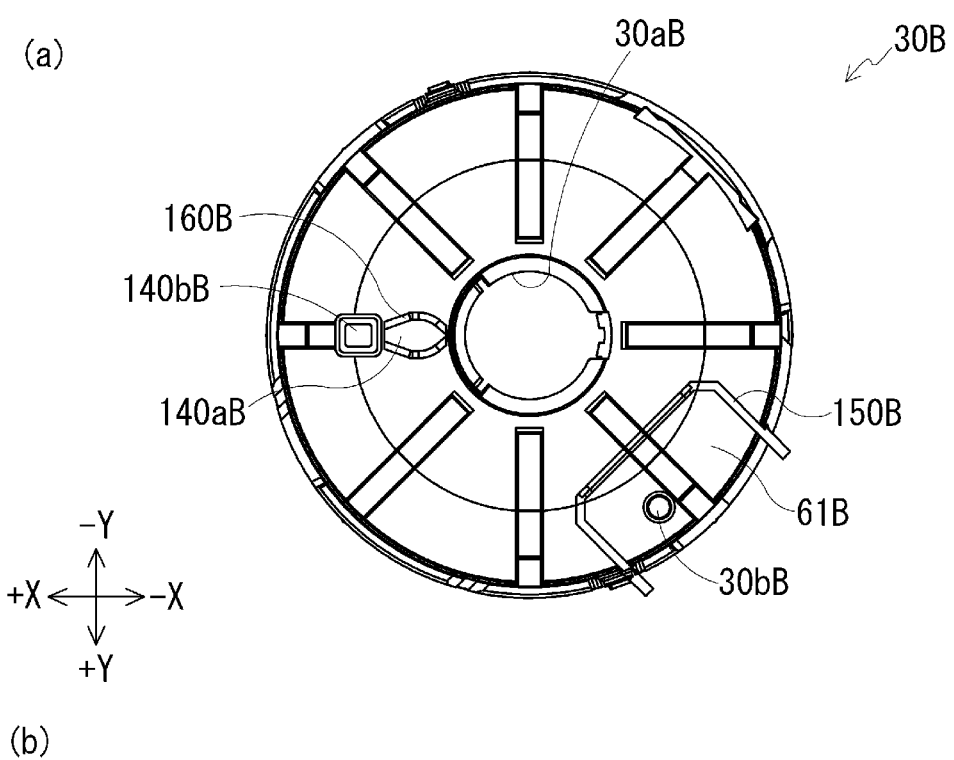
Figure 8:
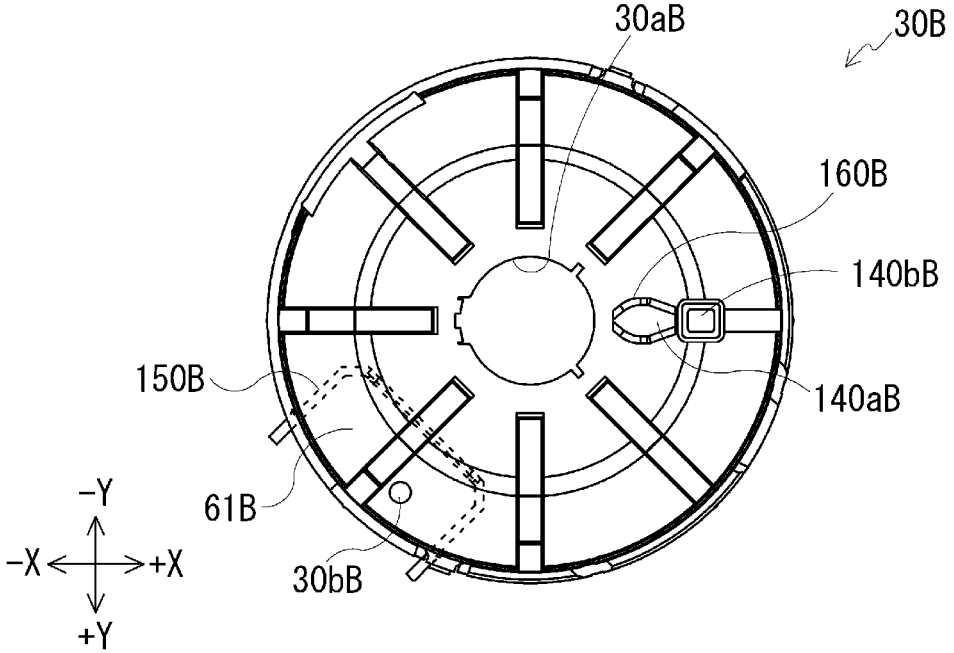

First, a description will be given of a configuration of the fire detection apparatus according to Embodiment 2. FIG. 5 is a side view illustrating an attachment state of the fire detection apparatus according to Embodiment 2. FIG. 6 is a diagram illustrating the fire detection apparatus in a state of removing an attachment base described below, in which FIG. 6(a) is a plan view and FIG. 6(b) is a bottom view. FIG. 7 is a cross-sectional view taken along A-A line of FIG. 6(b). FIG. 8 is a diagram illustrating an inner cover 30B, in which FIG. 8(a) is a plan view and FIG. 8(b) is a bottom view. In the following description, an X direction of FIG. 5 is referred to as a left-right direction of the fire detection apparatus (a +X direction is a left direction of the fire detection apparatus and a −X direction is a right direction of the fire detection apparatus), a Y direction of FIG. 6 is referred to as a front-back direction of the fire detection apparatus (a +Y direction is a frontward direction of the fire detection apparatus and a −Y direction is a backward direction of the fire detection apparatus), and a Z direction of FIG. 5 is referred to as a vertical direction of the fire detection apparatus (a +Z direction is an upward direction of the fire detection apparatus and a −Z direction is a downward direction of the fire detection apparatus).

The fire detection apparatus 1B is installed on an installation surface 2B on a lower surface of a ceiling portion of a building in an interior of the building as illustrated in FIG. 5, and includes an attachment base 10B, an outer cover 20B, an inner cover 30B, an inflow space 40B, an insect screen 50B, a carbon monoxide detection space 61B, a heat detection space 62B, a smoke detection space 63B, a detector cover 70B, a detector body 80B, a terminal board 90B, and a substrate 100B as illustrated in FIG. 5 to FIG. 7. A space including the "inflow space 40B", the "carbon monoxide detection space 61B", and the "smoke detection space 63B" corresponds to a "first detection space" in the claims.

(Configuration—Attachment Base)

Returning to FIG. 5, the attachment base 10B is an attaching unit that attaches the outer cover 20B to the installation surface 2B. The attachment base 10B is configured using, for example, a known attachment base for the fire detection apparatus (as an example, a substantially plate-shaped attachment base made of resin), etc., and is fixed to the installation surface 2B by a fixing tool, etc. as illustrated in FIG. 5.

(Configuration—Outer Cover)

The outer cover 20B is a cover that covers the inner cover 30B, the inflow space 40B, the insect screen 50B, the carbon monoxide detection space 61B, the smoke detection space 63B, the detector cover 70B, the detector body 80B, the terminal board 90B, and the substrate 100B. The outer cover 20B is formed of, for example, a resin material having a light shielding property, and includes an outer cover body 21B, a top surface portion 22B, a first rib portion 23B, and a second rib portion 24B as illustrated in FIG. 5 to FIG. 7.

Among these portions, the outer cover body 21B is a basic structure of the outer cover 20B. The outer cover body 21B is formed of, for example, a substantially hollow cylindrical body whose upper surface and lower surface are open, is disposed so that an upper end portion of the outer cover body 21B comes into contact with a lower surface of the attachment base 10B as illustrated in FIG. 5, and is fixed to the attachment base 10B by a fitting structure (or a fixing tool), etc.

In addition, the top surface portion 22B is a partition unit that partitions the inflow space 40B. The top surface portion 22B is formed of, for example, a substantially circular plate-shaped body, and is provided substantially horizontally below the outer cover body 21B as illustrated in FIG. 5 to FIG. 7.

In addition, the first rib portion 23B is a partition unit that partitions the inflow space 40B. The first rib portion 23B is formed from a substantially plate-shaped body, and is provided vertically between the outer cover body 21B and the top surface portion 22B. Specifically, as illustrated in FIG. 5 and FIG. 7, a plurality of first rib portions 23B is provided radially from the vicinity of a center of the outer cover 20B, and is connected to the outer cover body 21B and the top surface portion 22B.

In addition, the second rib portion 24B is a partition unit that partitions the inflow space 40B. The second rib portion 24B is formed from a substantially plate-shaped body, and is provided vertically between the outer cover body 21B and the top surface portion 22B. Specifically, as illustrated in FIG. 5 and FIG. 7, a plurality of second rib portions 24B is provided between inner end portions of adjacent first rib portions 23B, and is connected to the outer cover body 21B and the top surface portion 22B. Details of a configuration of the outer cover 20B will be described below.

(Configuration—Inflow Space)

Returning to FIG. 5, the inflow space 40B is a space for allowing smoke from the outside of the fire detection apparatus 1B or gas containing carbon monoxide to flow into the fire detection apparatus 1B. A plurality of inflow spaces 40B is formed inside the outer cover 20B. Specifically, as illustrated in FIG. 5 and FIG. 7, a space surrounded by the top surface portion 22B, the first rib portion 23B, the second rib portion 24B, and the inner cover 30B in an internal space of the outer cover 20B is formed as the inflow space 40B. The "smoke" and "carbon monoxide" described above correspond to a "first detection target" in the claims.

(Configuration—Inner Cover)

The inner cover 30B is a cover that covers the carbon monoxide detection space 61B, the smoke detection space 63B, the detector cover 70B, the detector body 80B, and the substrate 100B, and is a partition unit that partitions the inflow space 40B. The inner cover 30B is, for example, a substantially hollow cylindrical body whose upper surface is open, is formed of a resin material having a light shielding property, and is provided so that a lower side portion of the inner cover 30B faces the top surface portion 22B of the outer cover 20B through the inflow space 40B on the inside of the outer cover 20B as illustrated in FIG. 7.

In addition, as illustrated in FIG. 7 and FIG. 8, a first opening 30aB and an inflow hole 30bB are formed in the lower side portion of the inner cover 30B. The first opening 30aB is an opening for sending gas flowing into the inflow space 40B to the smoke detection space 63B, and is provided at a substantially central portion and the vicinity thereof in the lower side portion of the inner cover 30B as illustrated in FIG. 7. In addition, the inflow hole 30bB is an opening for sending gas flowing into the inflow space 40B to the carbon monoxide detection space 61B. As illustrated in FIG. 8, one inflow hole 30bB is provided in the inner cover 30B.

Specifically, the inflow hole 30bB is provided in a portion facing the carbon monoxide detection space 61B in the lower side portion of the inner cover 30B. Details of a configuration of the inner cover 30B will be described below. In addition, the "outer cover 20B" and the "inner cover 30B" described above correspond to a "housing" in the claims.

(Configuration—Carbon Monoxide Detection Space)

The carbon monoxide detection space 61B is a first detection space body in which carbon monoxide is detected. As illustrated in FIG. 8, a space surrounded by a first partition wall 150B described below and the substrate 100B in a space located inside the inner cover 30B is formed as the carbon monoxide detection space 61B.

(Configuration—Heat Detection Space)

Returning to FIG. 7, the heat detection space 62B is a second detection space for performing detection of heat. As illustrated in FIG. 7, a space located near an insertion hole 120B described below in a space located outside the outer cover 20B is formed as the heat detection space 62B. The "heat" corresponds to a "second detection target" in the claims.

(Configuration—Smoke Detection Space)

The smoke detection space 63B is the first detection space body in which smoke is detected. As illustrated in FIG. 7, a space surrounded by the detector cover 70B and the detector body 80B in the space located inside the inner cover 30B is formed as the smoke detection space 63B.

(Configuration—Detector Cover)

The detector cover 70B is a partition unit that partitions the smoke detection space 63B, and is an incidence suppression unit that inhibits ambient light from entering the smoke detection space 63B. The detector cover 70B is a substantially hollow cylindrical body whose upper surface is open, and is formed of a resin material having a light shielding property. In addition, as illustrated in FIG. 7, the detector cover 70B is disposed such that a lower side portion of the detector cover 70B faces the top surface portion 22B of the outer cover 20B through the first opening 30aB and the inflow space 40B on the inside of the inner cover 30B, and is fixed to the detector body 80B by a fitting structure, etc. In addition, as illustrated in FIG. 7, a second opening 70aB is formed in the lower side portion of the detector cover 70B. The second opening 70aB is an opening for allowing gas sent from the first opening 30aB to flow into the smoke detection space 63B, and is provided in a portion corresponding to the first opening 30aB in the lower side portion of the detector cover 70B as illustrated in FIG. 7.

(Configuration—Insect Screen)

The insect screen 50B is a net for preventing insects present outside the fire detection apparatus 1B from intruding into the smoke detection space 63B. The insect screen 50B is configured using a mesh-like and circular net, and is attached to the detector cover 70B as illustrated in FIG. 7.

(Configuration—Detector Body)

The detector body 80B is an attaching unit that attaches the detector cover 70B, and is an incidence suppression unit that suppresses incidence of ambient light into the smoke detection space 63B. The detector body 80B is formed of, for example, a resin material having a light shielding property, is disposed to cover an upper surface of the detector cover 70B as illustrated in FIG. 7, and is fixed to the substrate 100B by a fixing tool, etc. In addition, the detector body 80B is provided with a support (not illustrated) for supporting each of the first light emitting unit (described below), the second light emitting unit (described below), and the light receiving unit (described below). Furthermore, each optical path hole (not illustrated) for forming an optical path between the smoke detection space 63B and each of the first light emitting unit (described below), the second light emitting unit (described below), and the light receiving unit (described below) is formed in the detector body 80B.

(Configuration—Terminal Board)

The terminal board 90B is an accommodation unit that accommodates the inner cover 30B, the detector cover 70B, the detector body 80B, and the substrate 100B. The terminal board 90B has a substantially hollow cylindrical shape whose lower surface is open, and is formed of, for example, a resin material having a light shielding property. In addition, as illustrated in FIG. 7, the terminal board 90B is provided to cover the inner cover 30B, the detector cover 70B, the detector body 80B, and the substrate 100B from above, is fixed to the outer cover 20B by a fitting structure, etc., and is fixed to the attachment base 10B by a fixing tool, etc. through a first attachment hole 91aB formed in an attachment member 91B.

(Configuration—Substrate)

The substrate 100B is a mounting unit on which various electric circuits (not illustrated) are mounted. The substrate 100B is configured using, for example, a known flat plate-shaped circuit board, etc., is disposed substantially horizontally at a distance from an upper end portion and a lower end portion of the terminal board 90B in the terminal board 90B as illustrated in FIG. 7, and is fixed to the terminal board 90B by a fixing tool through an attachment hole (not illustrated) formed in the terminal board 90B and a second attachment hole 91bB formed in the attachment member 91B.

Further, in addition to the fact that a known electronic component used for the conventional fire detection apparatus 1B is mounted on the substrate 100B, as illustrated in FIG. 7, a smoke detection unit (not illustrated), a carbon monoxide detection unit (not illustrated), a heat detection unit 110B, a display unit (not illustrated), a communication unit (not illustrated), a power supply unit (not illustrated), a control unit (not illustrated), and a storage unit (not illustrated) are mounted on the substrate 100B.

(Configuration—Substrate Smoke Detection Unit)

Among these units, the smoke detection unit is a first detection target detecting unit that detects smoke. The smoke detection unit is configured using, for example, a known smoke detecting unit, and includes the first light emitting unit, the second light emitting unit, and the light receiving unit (none of which are illustrated). Here, the first light emitting unit is a first light emitting unit that irradiates the smoke detection space 63B with detection light (hereinafter referred to as "first detection light"), and is configured using, for example, a known light emitting element (as an example, an infrared LED, etc.). In addition, the second light emitting unit is a second light emitting unit that irradiates the smoke detection space 63B with detection light (hereinafter referred to as "second detection light") having a different wavelength from that of the first detection light, and is configured using, for example, a known light emitting element (as an example, a blue LED, etc.). In addition, the light receiving unit is a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light, and is configured using, for example, a known light receiving element (as an example, a photodiode, etc.). In addition, a method of installing the first light emitting unit, the second light emitting unit, and the light receiving unit is arbitrary. In Embodiment 2, installation is performed to be able to avoid direct reception of the first detection light or the second detection light irradiated from the first light emitting unit or the second light emitting unit to the light receiving unit through various optical path holes of the detector body 80B. For example, the first light emitting unit and the light receiving unit are installed at a position at which an angle between an optical axis of the first light emitting unit (hereinafter referred to as a "first light emitting-side optical axis") and an optical axis of the light receiving unit (hereinafter referred to as a "light receiving-side optical axis") is about 135°. In addition, the second light emitting unit and the light receiving unit are installed at a position at which an angle between an optical axis of the second light emitting unit (hereinafter referred to as a "second light emitting-side optical axis") and the light receiving-side optical axis is about 90°.

(Configuration—Substrate—Carbon Monoxide Detection Unit and Heat Detection Unit)

In addition, the carbon monoxide detection unit is a first detection target detecting unit that detects carbon monoxide. The carbon monoxide detection unit is configured using, for example, a known carbon monoxide detection element (as an example, a CO sensor, etc.), and is provided in a portion corresponding to the inflow hole 30bB in a portion of the substrate 100B (that is, is provided at a position close to the inflow hole 31bB on the inside of the inner cover 30B). In addition, the heat detection unit 110B is a second detection target detecting unit that detects heat. The heat detection unit 110B is configured using, for example, a known heat detection element (as an example, a thermistor, etc.), and is disposed so that a part of the heat detection unit 110B is inserted into the heat detection space 62B through an insertion hole (not illustrated) provided in each of the detector cover 70B and the detector body 80B, an insertion hole 140aB of the inner cover 30B described below, and the insertion hole 120B of the outer cover 20B described below as illustrated in FIG. 7.

(Configuration—Substrate—Display Unit, Communication Unit, and Power Supply Unit)

In addition, the display unit is a display unit that displays predetermined information (for example, information indicating the presence or absence of detection of a fire) by irradiating light (hereinafter referred to as "display light") to the outside of the fire detection apparatus 1B, and is configured using, for example, a known display unit (an LED, etc.). In addition, a light projection method of the display unit is arbitrary. Examples thereof include light projection by guiding display light from the display unit toward the outside of the fire detection apparatus 1B through a light guide (not illustrated) inserted into an insertion hole (not illustrated) provided in each of the detector cover 70B and the detector body 80B, an insertion hole 140bB of the inner cover 30B described below, and the insertion hole 120B of the outer cover 20B described below. In addition, the communication unit is a communication unit that communicates with an external apparatus (for example, a receiver, etc.). In addition, the power supply unit is a power supply unit that supplies power supplied from a commercial power supply or a battery (not illustrated) to each unit of the fire detection apparatus 1B.

(Configuration—Substrate—Control Unit and Storage Unit)

In addition, the control unit is a control unit that controls the fire detection apparatus 1B. Specifically, the control unit is a computer including a CPU and an internal memory such as a RAM for storing various programs (including a basic control program such as the OS and an application program activated on the OS to realize a specific function) to be interpreted and executed on the CPU, a program, and various data. In addition, the storage unit is a storage unit that stores programs and various data necessary for an operation of the fire detection apparatus 1B. The storage unit is configured using a rewritable recording medium. For example, it is possible to use a non-volatile recording medium such as a flash memory.

(Configuration—Details of Configuration of Outer Cover)

Returning to FIG. 5, next, a description will be given of details of a configuration of the outer cover 20B. However, the outer cover 20B may be manufactured in an arbitrary shape using an arbitrary method and material, unless otherwise specified.

In Embodiment 2, as illustrated in FIG. 5 to FIG. 7, the insertion hole 120B and a guard portion 130B are provided in the top surface portion 22B which is a side portion on the opposite side from a side portion on the installation surface 2B side in side portions of the outer cover 20B.

(Configuration—Details of Configuration of Outer Cover—Insertion Hole)

The insertion hole 120B is a through-hole for inserting a part of the heat detection unit 110B into the heat detection space 62B and irradiating display light from the display unit to the outside of the fire detection apparatus 1B.

Here, a specific shape and size of the insertion hole 120B are arbitrary. In Embodiment 2, as illustrated in FIG. 6(b), a planar shape of the insertion hole 120B is set to a substantially elliptical shape (or may be a polygonal shape such as a quadrangular shape). In addition, a diameter of the insertion hole 120B is set to a size that allows only a part of the heat detection unit 110B to be exposed to the heat detection space 62B and allows display light to be irradiated to the outside of the fire detection apparatus 1B. For example, the diameter is set to be longer than a length obtained by adding a diameter of the heat detection unit 110B to a diameter of the light guide.

In addition, a method of forming the insertion hole 120B is arbitrary. The insertion hole 120B is formed in a portion facing the inflow space 40B. Specifically, as illustrated in FIG. 6(b), the insertion hole 120B is formed in a right side portion on the top surface portion 22B. In this case, for example, the heat detection unit 110B and the display unit may be installed in a portion corresponding to the insertion hole 120B or the vicinity thereof in a portion of the substrate 100B. According to such a formation method, when compared to a case in which the insertion hole 120B is formed in the central portion of the top surface portion 22B, there are few restrictions on attachment of the heat detection unit 110B and the display unit. Therefore, it is possible to maintain an attachment property of the heat detection unit 110B and the display unit.

By such an insertion hole 120B, a part of the heat detection unit 110B may be inserted into the heat detection space 62B through insertion hole 120B, and display light from the display unit may be irradiated to the outside of the fire detection apparatus 1B through the insertion hole 120B.

(Configuration—Details of Configuration of Outer Cover—Guard Portion)

Returning to FIG. 5, the guard portion 130B is a guard unit that protects the heat detection unit. As illustrated in FIG. 5 to FIG. 7, the guard portion 130B is provided to cover a periphery of the insertion hole 120B and a portion of the heat detection unit 110B exposed to the outside of the fire detection apparatus 1B. In addition, the guard portion 130B is configured by combining a plurality of long ribs 131B (hereinafter referred to as "guard side ribs 131B"). Specifically, as illustrated in FIG. 5 to FIG. 7, the guard portion 130B is provided such that a longitudinal direction of each of the plurality of guard side ribs 131B extends substantially along the vertical direction (is slightly inclined in FIG. 6(*b*) and FIG. 7), and is vertically arranged with respect to a lower surface of the top surface portion 22B with an interval therebetween.

According to such a configuration, it is possible to inhibit the insertion hole 120B from being exposed to the outside of the fire detection apparatus 1B by the guard portion 130B, and it is possible to maintain the design property of the fire detection apparatus 1B without impairing the inflow property of gas to the guard portion 130B.

(Configuration—Details of Configuration of Inner Cover)

Next, a description will be given of details of the configuration of the inner cover 30B. However, the inner cover 30B may be manufactured in an arbitrary shape using an arbitrary method and material, unless otherwise specified.

In Embodiment 2, as illustrated in FIG. 8, the insertion hole 140*a*B, the insertion hole 140*b*B, the first partition wall 150B, and a second partition wall 160B are provided in the inner cover 30B.

(Configuration—Details of Configuration of Inner Cover—Insertion Hole)

The insertion hole 140*a*B is a through-hole for inserting a part of the heat detection unit 110B into the heat detection space 62B, and the insertion hole 140*b*B is a through-hole for irradiating display light from the display unit to the outside of the fire detection apparatus 1B. As illustrated in FIG. 8, the insertion holes 140*a*B and 140*b*B are provided in portions of the lower side portion of the inner cover 30B facing the inflow space 40B and corresponding to the insertion hole 120B, respectively.

(Configuration—Details of Configuration of Inner Cover—First Partition Wall)

The first partition wall 150B is a partition wall for partitioning the carbon monoxide detection space 61B so that gas flowing into the carbon monoxide detection space 61B is inhibited from flowing out to the heat detection space 62B. As illustrated in FIG. 8, the first partition wall 150B is provided to protrude upward from the lower side portion of the inner cover 30B on the inside of the inner cover 30B.

In addition, a specific configuration of the first partition wall 150B is arbitrary. In Embodiment 2, the first partition wall 150B is configured to surround at least a part of a periphery of the carbon monoxide detection unit and the inflow hole 30*b*B in the carbon monoxide detection space 61B. Specifically, as illustrated in FIG. 8, the first partition wall 150B is formed from a plate-shaped body whose planar shape is a U-shape (or an arc shape, etc.) which is open toward the outer side of the inner cover 30B, and is disposed such that a portion of an outer periphery of the carbon monoxide detection unit other than a portion on the outer cover body 21B side is covered by the first partition wall 150B. As illustrated in FIG. 8(*a*), even though a part (in FIG. 8(*a*), a portion on the outer cover body 21B side) of a side portion protruding upward from the lower side portion in side portions of the inner cover 30B (hereinafter referred to as a "peripheral side portion") is notched, since the notched part is covered by the outer cover body 21B, it is possible to prevent gas flowing into the carbon monoxide detection space 61B from flowing out to the outside through the notched part.

According to such a configuration, it is possible to inhibit gas flowing into the carbon monoxide detection space 61B from flowing out to the heat detection space 62B. Therefore, when compared to a case in which the first partition wall 150B is not provided, it is possible to prevent detection of the heat detection unit 110B from being inhibited by the gas that has flowed in, and it is possible to maintain or improve heat detection accuracy. In particular, since the first partition wall 150B is configured to surround the part of the periphery of the carbon monoxide detection unit and the inflow hole 30*b*B in the carbon monoxide detection space 61B, it is possible to effectively inhibit gas flowing into the carbon monoxide detection space 61B from flowing out to the heat detection space 62B through the inflow hole 30*b*B, and heat detection accuracy is easily maintained. Here, the statement that "detection of the heat detection unit 110B is inhibited by the gas that has flowed in" corresponds to, for example, a fact that when gas flowing in from the carbon monoxide detection space 61B flows out from the heat detection space 62B (that is, when an air flow from the carbon monoxide detection space 61B side to the heat detection unit 110B is generated), an external atmosphere is disturbed by the air flow, and the heat detection space 62B and the heat detection unit 110B are not directly reached, a fact that when air permeability of the heat detection space 62B is increased by gas flowing in from the carbon monoxide detection space 61B, even if an external atmosphere containing heat flows into the heat detection space 62B, the external atmosphere easily blows therethrough, and thus a time when the external atmosphere stays in the heat detection space 62B shortens, etc.

(Configuration—Details of Configuration of Inner Cover—Second Partition Wall)

The second partition wall 160B is a partition wall for partitioning the heat detection space 62B so that gas flowing into the inflow space 40B is inhibited from flowing out to the heat detection space 62B. As illustrated in FIG. 8, the second partition wall 160B is provided to protrude downward from the lower side portion of the inner cover 30B on the outside of the inner cover 30B.

In addition, a specific configuration of the second partition wall 160B is arbitrary. In Embodiment 2, the second partition wall 160B is configured to surround at least a part of a periphery of the insertion hole 120B, the insertion hole 140*a*B, and the heat detection unit 110B in the inflow space 40B. Specifically, as illustrated in FIG. 8, the second partition wall 160B is formed from a tubular body (for example, a cylindrical body, a square tubular body, etc.), and is disposed such that the entire outer periphery of each of the insertion hole 120B, the insertion hole 140*a*B, and the heat detection unit 110B is covered by the second partition wall 160B. In addition, since a vertical length of the second partition wall 160B is set to be substantially the same as a vertical length of the inflow space 40B, and the second partition wall 160B is disposed such that a lower end portion of the second partition wall 160B comes into contact with the top surface portion 22B, gas flowing into the inflow space 40B is inhibited from flowing out to the heat detection space 62B through a gap between the lower end portion of the second partition wall 160B and the top surface portion 22B.

According to such a configuration, it is possible to inhibit gas flowing into the inflow space 40B from flowing out to the heat detection space 62B. Therefore, when compared to a case in which the second partition wall 160B is not provided, it is possible to prevent detection of the heat detection unit 110B from being inhibited by gas that has flowed in, and to maintain or improve heat detection accuracy. In particular, since the second partition wall 160B is configured to surround the entire periphery of each of the insertion hole 120B, the insertion hole 140aB, and the heat detection unit 110B in the inflow space 40B, it is possible to effectively inhibit gas flowing into the inflow space 40B from flowing out to the heat detection space 62B through the insertion hole 120B or the insertion hole 140aB, and heat detection accuracy is easily maintained. Here, the statement that "detection of the heat detection unit 110B is inhibited by the gas that has flowed in" corresponds to, for example, a fact that when gas flowing in from the inflow space 40B flows out from the heat detection space 62B (that is, when an air flow from the inflow space 40B side to the heat detection unit 110B is generated), an external atmosphere is disturbed by the air flow, and the heat detection space 62B and the heat detection unit 110B are not directly reached, a fact that when air permeability of the heat detection space 62B is increased by gas flowing in from the inflow space 40B, even if an external atmosphere containing heat flows into the heat detection space 62B, the external atmosphere easily blows therethrough, and thus a time when the external atmosphere stays in the heat detection space 62B shortens, etc.

(Configuration—Details of Configuration of Inner Cover—Other Configurations)

In addition, a method of forming the first partition wall 150B and the second partition wall 160B is arbitrary. In Embodiment 2, the first partition wall 150B and the second partition wall 160B, and the inner cover 30B are mutually integrally formed. For example, the portions may be integrally formed by injection-molding a resin material having a light shielding property. In this way, when compared to a case in which the first partition wall 150B and the second partition wall 160B are separately formed from the inner cover 30B, it is possible to save time and effort to attach the first partition wall 150B and the second partition wall 160B to the inner cover 30B, and to improve manufacturability of the fire detection apparatus 1B. In addition, it is possible to reduce the number of parts of the fire detection apparatus 1B, and to reduce an environmental load accompanying manufacture of the fire detection apparatus 1B. However, the invention is not limited thereto. For example, the first partition wall 150B and the second partition wall 160B may be separately formed from the inner cover 30B, and the first partition wall 150B and the second partition wall 160B may be connected to the inner cover 30B by a fixing tool, a fitting structure, etc.

(With Regard to Action of Fire Detection Apparatus)

Next, a description will be given of an action of the fire detection apparatus 1B configured as described above.

That is, for example, when gas present outside the fire detection apparatus 1B flows into the carbon monoxide detection space 61B through the inflow space 40B and the inflow hole 30bB in a state in which the fire detection apparatus 1B is attached to the installation surface 2B, the gas that has flowed in is inhibited from moving to a space other than the carbon monoxide detection space 61B in a space inside the inner cover 30B by the first partition wall 150B. Therefore, it is possible to inhibit the gas that has flowed in from flowing out to the heat detection space 62B.

In addition, for example, when gas present outside the fire detection apparatus 1B flows into the inflow space 40B, the gas that has flowed in is inhibited from moving to the internal space of the second partition wall 160B in the inflow space 40B by the second partition wall 160B. Therefore, it is possible to inhibit the gas that has flowed in from flowing out to the heat detection space 62B.

Effect of Embodiment 2

As described above, according to Embodiment 2, since the inflow space 40B, the carbon monoxide detection space 61B, and the smoke detection space 63B for performing detection of the first detection target contained in gas flowing in from the outside of the housing in the housing, the heat detection space 62B located outside the housing to perform detection of the second detection target, and the first partition wall 150B and the second partition wall 160B provided in the housing to partition the inflow space 40B, the carbon monoxide detection space 61B, or the heat detection space 62B so that gas flowing into the inflow space 40B or the carbon monoxide detection space 61B can be inhibited from flowing out to the heat detection space 62B are included, it is possible to inhibit gas flowing into the inflow space 40B or the carbon monoxide detection space 61B from flowing out to the heat detection space 62B. Therefore, when compared to a case in which the first partition wall 150B and the second partition wall 160B are not provided, it is possible to prevent detection of the second detection target by the heat detection unit 110B from being inhibited by the gas that has flowed in, and it is possible to maintain or improve detection accuracy of the second detection target.

In addition, since the insertion hole 120B and the insertion hole 140aB provided in a portion facing the inflow space 40B in a portion of the housing to insert a part of the heat detection unit 110B into the heat detection space 62B are included, and the second partition wall 160B is configured to surround at least the part of the periphery of the insertion hole 120B, the insertion hole 140aB, and the heat detection unit 110B in the inflow space 40B, it is possible to effectively inhibit gas flowing into the inflow space 40B from flowing out to the heat detection space 62B through the insertion hole 120B and the insertion hole 140aB, and detection accuracy of the second detection target is easily maintained.

In addition, since the inflow hole 30bB provided in the housing and the carbon monoxide detection unit for detecting the first detection target are included, and the partition wall 150B is configured to surround at least the part of the periphery of the carbon monoxide detection unit and the inflow hole 30bB in the carbon monoxide detection space 61B, it is possible to effectively inhibit gas flowing into the carbon monoxide detection space 61B from flowing out to the heat detection space 62B through the inflow hole 30bB, and detection accuracy of the second detection target is easily maintained.

In addition, since the inner cover 30B, and the first partition wall 150B and the second partition wall 160B are mutually integrally formed, when compared to a case in which the inner cover 30B is separately formed from the first partition wall 150B and the second partition wall 160B, it is possible to save time and effort to attach the first partition wall 150B and the second partition wall 160B to the inner cover 30B, and to improve manufacturability of the fire detection apparatus 1B. In addition, it is possible to reduce the number of parts of the fire detection apparatus 1B, and to reduce an environmental load accompanying manufacture of the fire detection apparatus 1B.

In addition, since the first detection target is smoke or carbon monoxide, and the second detection target is heat, it is possible to inhibit gas containing smoke or carbon monoxide from flowing out to the heat detection space 62B, and it is possible to maintain or improve heat detection accuracy.

Embodiment 3

Next, a fire detection apparatus according to Embodiment 3 will be described. Embodiment 3 corresponds to a mode of including a cover unit described below for covering at least a part of a periphery of a detection unit described below.

(Configuration)

Figure 9:
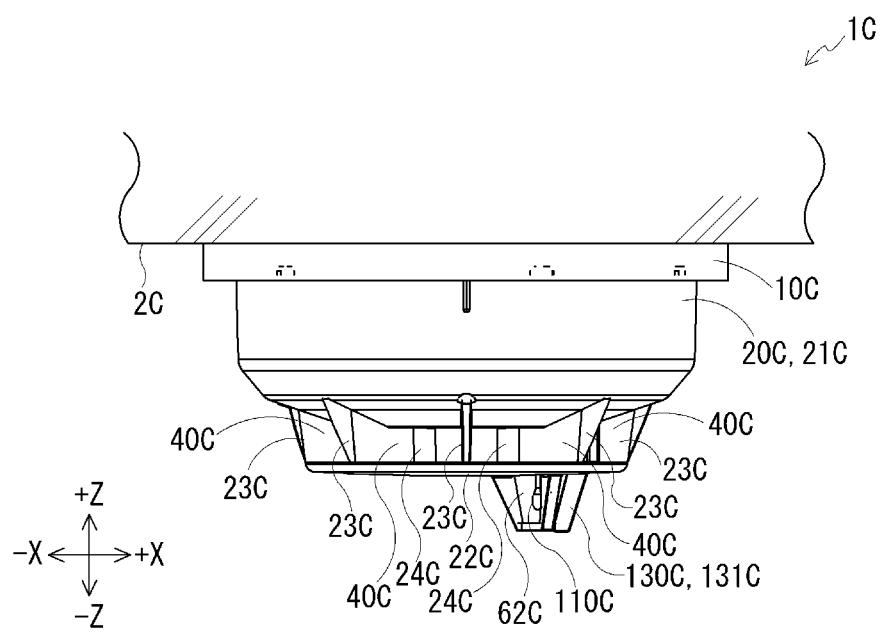
FIG. 9 is a side view illustrating an attachment state of a fire detection apparatus according to Embodiment 3.
Figure 10:
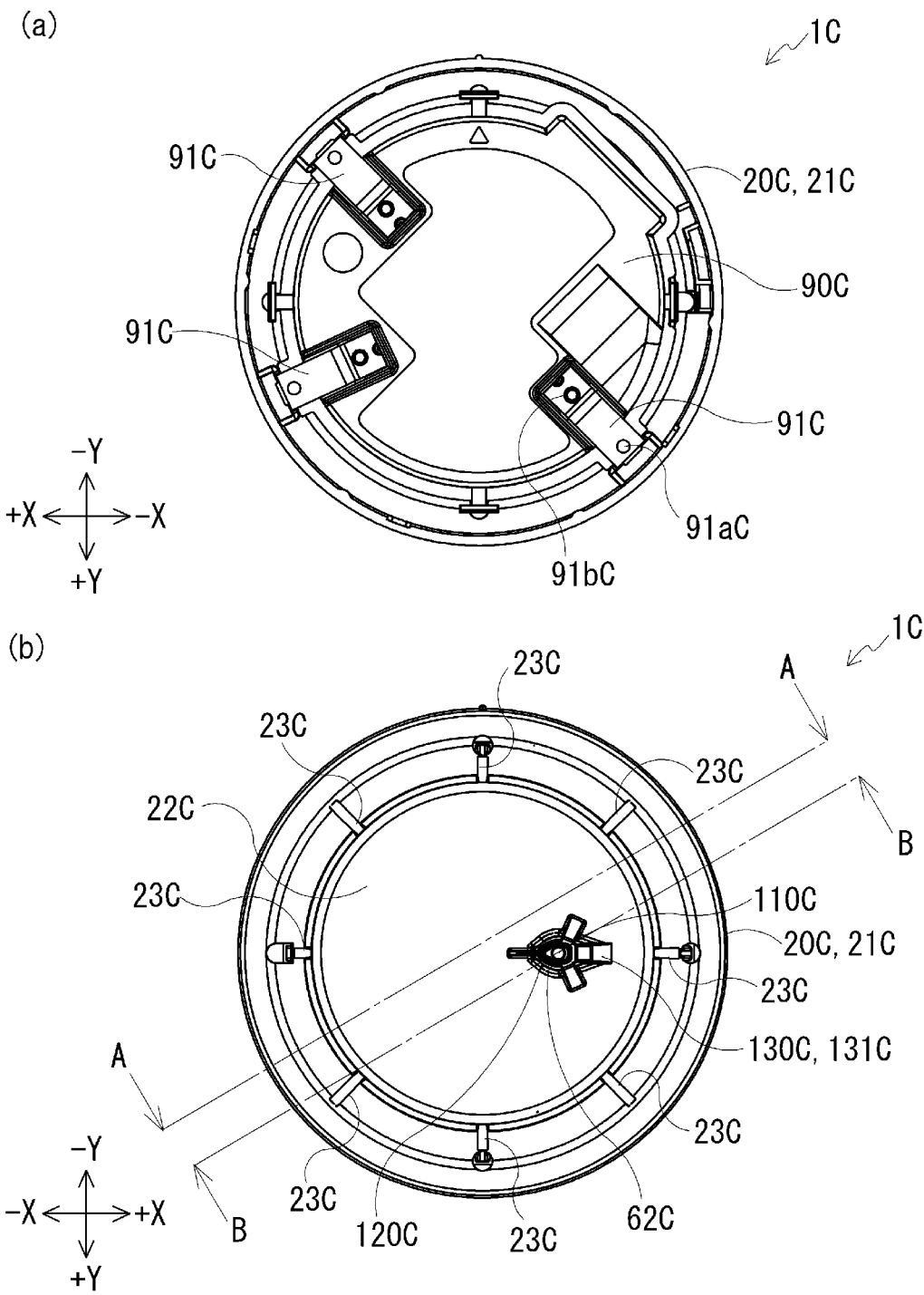
Figure 11:
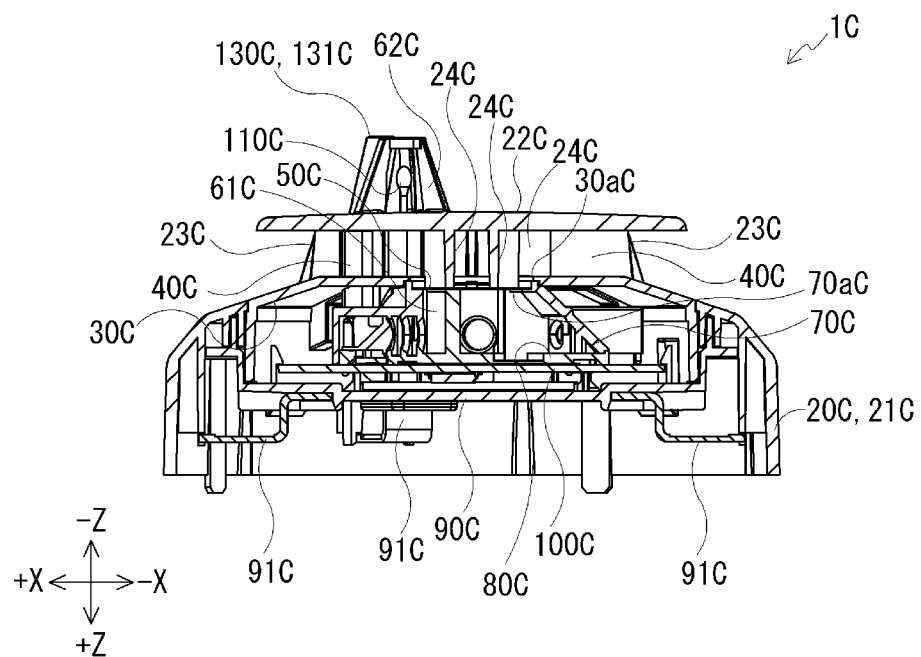
FIG. 11 is a cross-sectional view taken along A-A line of FIG. 10(b).
Figure 12:
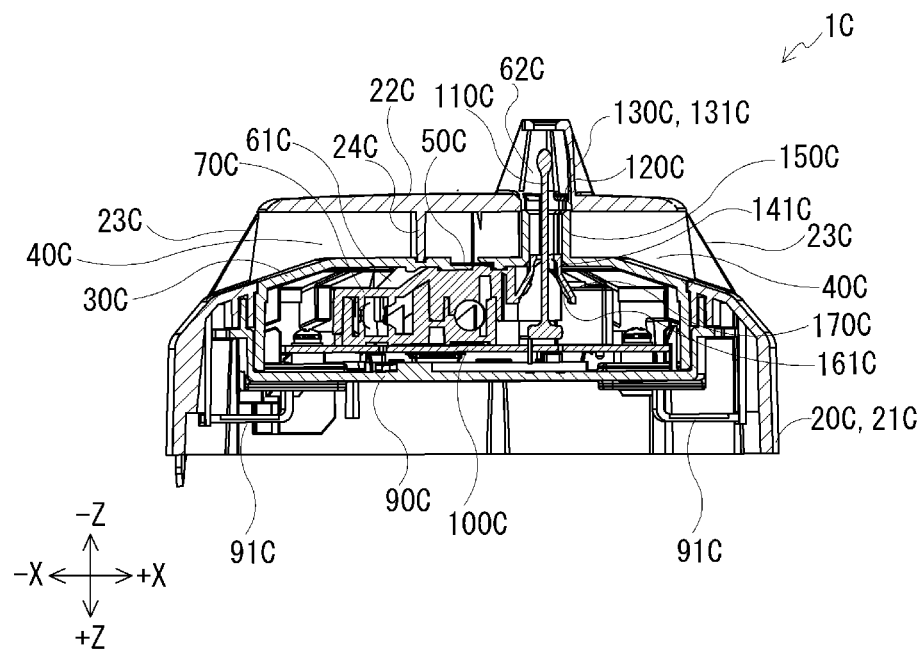
FIG. 12 is a cross-sectional view taken along B-B line of FIG. 10(b).

First, a description will be given of a configuration of the fire detection apparatus according to Embodiment 3. FIG. 9 is a side view illustrating an attachment state of the fire detection apparatus according to Embodiment 3. FIG. 10 is a diagram illustrating the fire detection apparatus in a state of removing an attachment base described below, in which FIG. 10(a) is a plan view and FIG. 10(b) is a bottom view. FIG. 11 is a cross-sectional view taken along A-A line of FIG. 10(b). FIG. 12 is a cross-sectional view taken along B-B line of FIG. 10(b). In the following description, an X direction of FIG. 9 is referred to as a left-right direction of the fire detection apparatus (a +X direction is a left direction of the fire detection apparatus and a −X direction is a right direction of the fire detection apparatus), a Y direction of FIG. 10 is referred to as a front-back direction of the fire detection apparatus (a +Y direction is a frontward direction of the fire detection apparatus and a −Y direction is a backward direction of the fire detection apparatus), and a Z direction of FIG. 9 is referred to as a vertical direction of the fire detection apparatus (a +Z direction is an upward direction of the fire detection apparatus and a −Z direction is a downward direction of the fire detection apparatus).

The fire detection apparatus 1C is installed on an installation surface 2C on a lower surface of a ceiling portion of a building in an interior of the building as illustrated in FIG. 9, and includes an attachment base 10C, an outer cover 20C, an inner cover 30C, an inflow space 40C, an insect screen 50C, a first detection space 61C, a second detection space 62C, a detector cover 70C, a detector body 80C, a terminal board 90C, and a substrate 100C as illustrated in FIG. 9 to FIG. 12.

(Configuration—Attachment Base)

Returning to FIG. 9, the attachment base 10C is an attaching unit that attaches the outer cover 20C to the installation surface 2C. The attachment base 10C is configured using, for example, a known attachment base for the fire detection apparatus (as an example, a substantially plate-shaped attachment base made of resin), etc., and is fixed to the installation surface 2C by a fixing tool, etc. as illustrated in FIG. 9.

(Configuration—Outer Cover)

The outer cover 20C is a cover that covers the inner cover 30C, the inflow space 40C, the insect screen 50C, the first detection space 61C, the detector cover 70C, the detector body 80C, the terminal board 90C, and the substrate 100C. The outer cover 20C is formed of, for example, a resin material having a light shielding property, and includes an outer cover body 21C, a top surface portion 22C, a first rib portion 23C, and a second rib portion 24C as illustrated in FIG. 9 to FIG. 11.

Among these portions, the outer cover body 21C is a basic structure of the outer cover 20C. The outer cover body 21C is formed of, for example, a substantially hollow cylindrical body whose upper surface and lower surface are open, is disposed so that an upper end portion of the outer cover body 21C comes into contact with a lower surface of the attachment base 10C as illustrated in FIG. 9, and is fixed to the attachment base 10C by a fitting structure (or a fixing tool), etc.

In addition, the top surface portion 22C is a partition unit that partitions the inflow space 40C. The top surface portion 22C is formed of, for example, a substantially circular plate-shaped body, is provided substantially horizontally below the outer cover body 21C as illustrated in FIG. 9 to FIG. 11, and is provided to face the second detection space 62C. The top surface portion 22C corresponds to a "facing side portion" in the claims.

In addition, the first rib portion 23C is a partition unit that partitions the inflow space 40C. The first rib portion 23C is formed from a substantially plate-shaped body, and is provided vertically between the outer cover body 21C and the top surface portion 22C. Specifically, as illustrated in FIG. 9 and FIG. 11, a plurality of first rib portions 23C is provided radially from the vicinity of a center of the outer cover 20C, and is connected to the outer cover body 21C and the top surface portion 22C.

In addition, the second rib portion 24C is a partition unit that partitions the inflow space 40C. The second rib portion 24C is formed from a substantially plate-shaped body, and is provided vertically between the outer cover body 21C and the top surface portion 22C. Specifically, as illustrated in FIG. 9 and FIG. 11, a plurality of second rib portions 24C is provided between inner end portions of adjacent first rib portions 23C, and is connected to the outer cover body 21C and the top surface portion 22C. Details of a configuration of the outer cover 20C will be described below.

(Configuration—Inflow Space)

Returning to FIG. 9, the inflow space 40C is a space for allowing gas containing a first detection target (specifically smoke) to flow from the outside of the fire detection apparatus 1C into the fire detection apparatus 1C. A plurality of inflow spaces 40C is formed inside the outer cover 20C. Specifically, as illustrated in FIG. 9 and FIG. 11, a space surrounded by the top surface portion 22C, the first rib portion 23C, the second rib portion 24C, and the inner cover 30C in an internal space of the outer cover 20C is formed as the inflow space 40C.

(Configuration—Inner Cover)

The inner cover 30C is a cover that covers the first detection space 61C, the detector cover 70C, the detector body 80C, and the substrate 100C, and is a partition unit that partitions the inflow space 40C. The inner cover 30C is, for example, a substantially hollow cylindrical body whose upper surface is open, is formed of a resin material having a light shielding property, and is provided so that a lower side portion of the inner cover 30C faces the top surface portion 22C of the outer cover 20C through the inflow space 40C on the inside of the outer cover 20C as illustrated in FIG. 11.

In addition, as illustrated in FIG. 11, a first opening 30aC is provided in the lower side surface of the inner cover 30C. The first opening 30aC is an opening for sending gas flowing into the inflow space 40C to the first detection space 61C, and is provided at a substantially central portion and the vicinity thereof in the lower side surface of the inner cover 30C as illustrated in FIG. 11. Details of the configuration of the inner cover 30C will be described below. In addition, a portion including the "outer cover 20C" and the "inner cover 30C" described above corresponds to a "housing" in the claims.

(Configuration—First Detection Space)

The first detection space 61C is a space for detecting the first detection target. As illustrated in FIG. 11, a space surrounded by the detector cover 70C and the detector body 80C in a space located inside the inner cover 30C is formed as the first detection space 61C.

(Configuration—Second Detection Space)

The second detection space 62C is a space for detecting a second detection target (specifically heat). As illustrated in FIG. 11, a space located near a insertion hole 120C described below in a space located outside the outer cover 20C is formed as the second detection space 62C.

(Configuration—Detector Cover)

The detector cover 70C is a partition unit that partitions the first detection space 61C, and is an incidence suppression unit that suppresses incidence of ambient light into the first detection space 61C. The detector cover 70C is a substantially hollow cylindrical body whose upper surface is open, and is formed of a resin material having a light shielding property. In addition, as illustrated in FIG. 11, the detector cover 70C is disposed so that a lower side surface of the detector cover 70C faces the top surface portion 22C of the outer cover 20C through the first opening 30aC and the inflow space 40C on the inside of the inner cover 30C, and is fixed to the detector body 80C by a fitting structure, etc. In addition, as illustrated in FIG. 11, a second opening 70aC is formed in the lower side surface of the detector cover 70C. The second opening 70aC is an opening for allowing gas sent from the first opening 30aC to flow into the first detection space 61C, and is provided at a portion corresponding to the first opening 30aC on the lower side surface of the detector cover 70C as illustrated in FIG. 11.

(Configuration—Insect Screen)

The insect screen 50C is a net for preventing insects present outside the fire detection apparatus 1C from intruding into the first detection space 61C. The insect screen 50C is configured using a mesh-like and circular net, and is attached to the detector cover 70C as illustrated in FIG. 11.

(Configuration—Detector Body)

The detector body 80C is an attaching unit that attaches the detector cover 70C, and is an incidence suppression unit that suppresses incidence of ambient light into the first detection space 61C. The detector body 80C is formed of, for example, a resin material having a light shielding property, is disposed to cover an upper surface of the detector cover 70C as illustrated in FIG. 11, and is fixed to the substrate 100C by a fixing tool, etc. In addition, the detector body 80C is provided with a support (not illustrated) for supporting each of a first light emitting unit (described below), a second light emitting unit (described below), and a light receiving unit (described below). Furthermore, each optical path hole (not illustrated) for forming an optical path between the first detection space 61C and each of the first light emitting unit (described below), the second light emitting unit (described below), and the light receiving unit (described below) is formed in the detector body 80C.

(Configuration—Terminal Board)

The terminal board 90C is an accommodation unit that accommodates the inner cover 30C, the detector cover 70C, the detector body 80C, and the substrate 100C. The terminal board 90C has a substantially hollow cylindrical shape whose lower surface is open, and is formed of, for example, a resin material having a light shielding property. In addition, as illustrated in FIG. 11, the terminal board 90C is provided to cover the inner cover 30C, the detector cover 70C, the detector body 80C, and the substrate 100C from above, and is fixed to the outer cover 20C by a fitting structure, etc., and is fixed to the attachment base 10C by a fixing tool, etc. through a first attachment hole 91aC formed in an attachment member 91C.

(Configuration—Substrate)

The substrate 100C is a mounting unit on which various electric circuits (not illustrated) are mounted. The substrate 100C is configured using, for example, a known flat plate-shaped circuit board, etc., is disposed substantially horizontally at a distance from an upper end portion and a lower end portion of the terminal board 90C in the terminal board 90C as illustrated in FIG. 11, and is fixed to the terminal board 90C by a fixing tool through an attachment hole (not illustrated) formed in the terminal board 90C and a second attachment hole 91bC formed in the attachment member 91C.

Further, in addition to the fact that a known electronic component used for the conventional fire detection apparatus 1C is mounted on the substrate 100C, as illustrated in FIG. 11 and FIG. 12, the first light emitting unit (not illustrated), the second light emitting unit (not illustrated), the light receiving unit (not illustrated), a heat detection unit 110C, a display unit (not illustrated), a communication unit (not illustrated), a power supply unit (not illustrated), a control unit (not illustrated), and a storage unit (not illustrated) are mounted on the substrate 100C.

(Configuration—Substrate—First Light Emitting Unit, Second Light Emitting Unit, and Light Receiving Unit)

Among these units, the first light emitting unit is a first light emitting unit that irradiates the first detection space 61C with detection light (hereinafter referred to as "first detection light"), and is configured using, for example, a known light emitting element (as an example, an infrared LED, etc.). In addition, the second light emitting unit is a second light emitting unit that irradiates the first detection space 61C with detection light (hereinafter referred to as "second detection light") having a different wavelength from that of the first detection light, and is configured using, for example, a known light emitting element (as an example, a blue LED, etc.). In addition, the light receiving unit is a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light, and is configured using, for example, a known light receiving element (as an example, a photodiode, etc.). In addition, a method of installing the first light emitting unit, the second light emitting unit, and the light receiving unit is arbitrary. In Embodiment 3, installation is performed to be able to avoid direct reception of the first detection light or the second detection light irradiated from the first light emitting unit or the second light emitting unit to the light receiving unit through various optical path holes of the detector body 80C. For example, the first light emitting unit and the light receiving unit are installed at a position at which an angle between an optical axis of the first light emitting unit (hereinafter referred to as a "first light emitting-side optical axis") and an optical axis of the light receiving unit (hereinafter referred to as a "light receiving-side optical axis") is about 135°. In addition, the second light emitting unit and the light receiving unit are installed at a position at which an angle between an optical axis of the second light emitting unit (hereinafter referred to as a "second light emitting-side optical axis") and the light receiving-side optical axis is about 90°.

(Configuration—Substrate—Heat Detection Unit)

In addition, the heat detection unit 110C is a detection unit that detects the second detection target. The heat detection unit 110C is configured using, for example, a known heat detection element (as an example, a thermistor, etc.), and is disposed so that a part of the heat detection unit 110C is inserted into (accommodated in) the second detection space 62C through an insertion hole (not illustrated) provided in the detector body 80C, an insertion hole 161C of the detector cover 70C described below, an insertion hole 141C of the inner cover 30C described below, and the insertion hole 120C of the outer cover 20C described below as illustrated in FIG. 12.

(Configuration—Substrate—Display Unit, Communication Unit, and Power Supply Unit)

In addition, the display unit is a display unit that displays predetermined information (for example, information indicating the presence or absence of detection of a fire) by irradiating light (hereinafter referred to as "display light") to the outside of the fire detection apparatus 1C, and is configured using, for example, a known display unit (an LED, etc.). In addition, a light projection method of the display unit is arbitrary. Examples thereof include light projection by guiding display light from the display unit toward the outside of the fire detection apparatus 1C through an insertion hole (not illustrated) provided in the detector body 80C, an insertion hole 162C of the detector cover 70C described below, an insertion hole 142C of the inner cover 30C described below, and a light guide (not illustrated) inserted into the insertion hole 120C of the outer cover 20C described below. In addition, the communication unit is a communication unit that communicates with an external apparatus (for example, a receiver, etc.). In addition, the power supply unit is a power supply unit that supplies power supplied from a commercial power supply or a battery (not illustrated) to each unit of the fire detection apparatus 1C.

(Configuration—Substrate—Control Unit and Storage Unit)

In addition, the control unit is a control unit that controls the fire detection apparatus 1C. Specifically, the control unit is a computer including a CPU and an internal memory such as a RAM for storing various programs (including a basic control program such as the OS and an application program activated on the OS to realize a specific function) to be interpreted and executed on the CPU, a program, and various data. In addition, the storage unit is a storage unit that stores programs and various data necessary for an operation of the fire detection apparatus 1C. The storage unit is configured using a rewritable recording medium. For example, it is possible to use a non-volatile recording medium such as a flash memory.

(Configuration—Details of Configuration of Outer Cover)

Returning to FIG. 9, next, a description will be given of details of a configuration of the outer cover 20C. However, the outer cover 20C may be manufactured in an arbitrary shape using an arbitrary method and material, unless otherwise specified.

In Embodiment 3, as illustrated in FIG. 9 to FIG. 12, the insertion hole 120C and a guard portion 130C are provided in the top surface portion 22C of the outer cover 20C.

(Configuration—Details of Configuration of Outer Cover—Insertion Hole)

The insertion hole 120C is a through-hole for inserting a part of the heat detection unit 110C into the second detection space 62C and irradiating display light from the display unit to the outside of the fire detection apparatus 1C.

Here, a specific shape and size of the insertion hole 120C are arbitrary. In Embodiment 3, as illustrated in FIG. 10(b), a planar shape of the insertion hole 120C is set to a substantially elliptical shape (or may be a polygonal shape such as a quadrangular shape). In addition, a diameter of the insertion hole 120C is set to a size that allows only a part of the heat detection unit 110C to be exposed to the second detection space 62C and allows display light to be irradiated to the outside of the fire detection apparatus 1C. For example, the diameter is set to be longer than a length obtained by adding a diameter of the heat detection unit 110C to a diameter of the light guide.

In addition, a method of forming the insertion hole 120C is arbitrary. The insertion hole 120C is formed in a portion facing the inflow space 40C. Specifically, as illustrated in FIG. 10(b), the insertion hole 120C is formed in a right side portion on the top surface portion 22C. In this case, for example, the heat detection unit 110C and the display unit may be installed in a portion corresponding to the insertion hole 120C or the vicinity thereof in a portion of the substrate 100C. According to such a formation method, when compared to a case in which the insertion hole 120C is formed in the central portion of the top surface portion 22C, there are few restrictions on attachment of the heat detection unit 110C and the display unit. Therefore, it is possible to maintain an attachment property of the heat detection unit 110C and the display unit.

According to such an insertion hole 120C, a part of the heat detection unit 110C may be inserted into the second detection space 62C through the insertion hole 120C, and display light from the display unit may be irradiated to the outside of the fire detection apparatus 1C through the insertion hole 120C.

(Configuration—Details of Configuration of Outer Cover—Guard Portion)

The guard portion 130C is a guard unit that protects the heat detection unit. As illustrated in FIG. 9 to FIG. 12, the guard portion 130C is provided to cover a periphery of the insertion hole 120C and a portion of the heat detection unit 110C exposed to the outside of the fire detection apparatus 1C. In addition, the guard portion 130C is configured by combining a plurality of long ribs 131C (hereinafter referred to as "guard side ribs 131C"). Specifically, as illustrated in FIG. 9 to FIG. 12, the guard portion 130C is provided such that a longitudinal direction of each of the plurality of guard side ribs 131C extends substantially along the vertical direction (is slightly inclined in FIG. 10(b) and FIG. 11), and is vertically arranged with respect to a lower surface of the top surface portion 22C with an interval therebetween.

According to such a configuration, it is possible to inhibit the insertion hole 120C from being exposed to the outside of the fire detection apparatus 1C by the guard portion 130C, and it is possible to maintain the design property of the fire detection apparatus 1C without impairing the inflow property of gas to the guard portion 130C.

(Configuration—Details of Configuration of Inner Cover)

Figure 13:
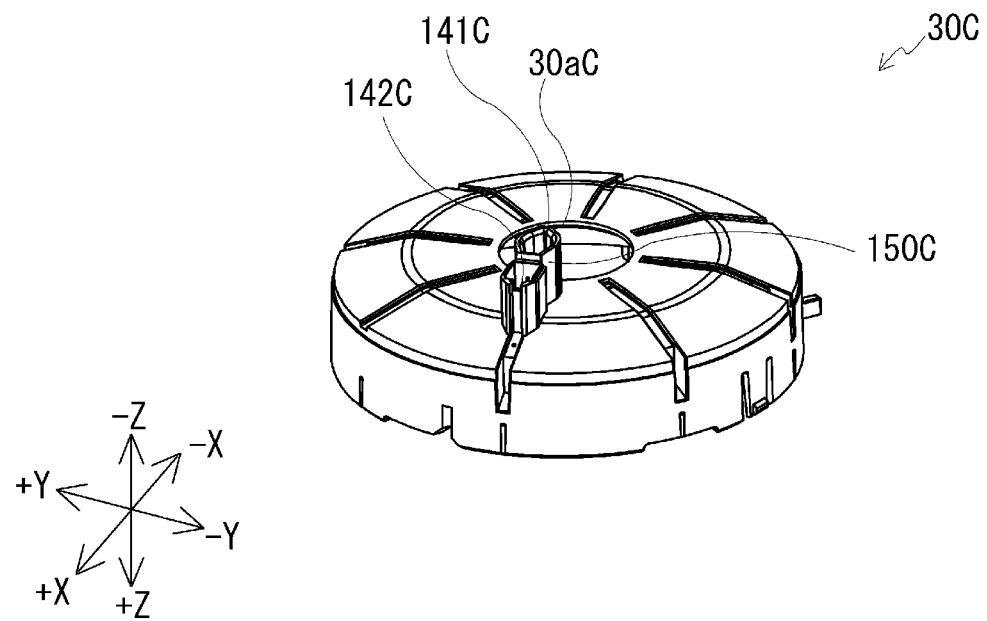
FIG. 13 is a perspective view illustrating an inner cover.

Returning to FIG. 11, next, a description will be given of details of the configuration of the inner cover 30C. FIG. 13 is a perspective view illustrating the inner cover 30C. However, the inner cover 30C may be manufactured in an arbitrary shape using an arbitrary method and material, unless otherwise specified.

In Embodiment 3, as illustrated in FIG. 11 to FIG. 13, the insertion hole 141C, the insertion hole 142C, and a first cover portion 150C are provided in the inner cover 30C.

(Configuration—Details of Configuration of Inner Cover—Insertion Hole)

The insertion hole 141C is a through-hole for inserting a part of the heat detection unit 110C into the second detection space 62C, and the insertion hole 142C is a through-hole for irradiating display light from the display unit to the outside of the fire detection apparatus 1C. As illustrated in FIG. 12 and FIG. 13, the insertion holes 141C and 142C are provided in portions of the lower side portion of the inner cover 30C facing the inflow space 40C and corresponding to the insertion hole 120C, respectively.

(Configuration—Details of Configuration of Inner Cover—First Cover Portion)

The first cover portion 150C is a cover unit that covers at least a part of a periphery of the heat detection unit 110C so that gas flowing into the inflow space 40C can be inhibited from coming into contact with the heat detection unit 110C. As illustrated in FIG. 12 and FIG. 13, the first cover portion 150C is provided to protrude downward from the lower side portion of the inner cover 30C on the outside of the inner cover 30C.

In addition, a specific configuration of the first cover portion 150C is arbitrary. In Embodiment 3, the first cover portion 150C is configured to surround at least a part of a periphery of a portion of the heat detection unit 110C located in the inflow space 40C (hereinafter referred to as a "first portion").

Specifically, first, as illustrated in FIG. 12 and FIG. 13, the first cover portion 150C is formed from a tubular body (for example, a cylindrical body, a square tubular body, etc.) into which the heat detection unit 110C can be inserted, and is disposed such that the entire outer periphery of each of the insertion hole 120C, the insertion hole 141C, and the first portion of the heat detection unit 110C is covered by the first cover portion 150C. In this case, an inner diameter of the first cover portion 150C is arbitrary. For example, gas flowing into the inflow space 40C may be inhibited from coming into contact with the heat detection unit 110C by setting an inner diameter of at least a part of the first cover portion 150C to be substantially the same as an outer diameter of a portion of the heat detection unit 110C inserted into the first cover portion 150C (specifically, an outer diameter of a cross section of the first portion along an X-Y plane) (an inner diameter of a second cover portion 170C described below may be similarly set). In this way, it is possible to simply configure the first cover portion 150C, and to improve manufacturability of the first cover portion 150C.

In addition, the first cover portion 150C and the insertion hole 120C are configured such that an end portion of the first cover portion 150C on the second detection space 62C side (a lower end portion of the first cover portion 150C in FIG. 12) is fit to the top surface portion 22C through the insertion hole 120C. More specifically, as illustrated in FIG. 12, a vertical length of the first cover portion 150C is set to be substantially the same as a vertical length of the inflow space 40C. In addition, a fitting portion (not illustrated) is provided in any one of the lower end portion of the first cover portion 150C or a portion of the top surface portion 22C near the insertion hole 120C, a fit portion (not illustrated) is provided in the other one of the lower end portion of the first cover portion 150C or the portion of the top surface portion 22C near the insertion hole 120C, and the first cover portion 150C is disposed such that the fit portion is fit by the fitting portion. In this way, it is possible to inhibit gas flowing into the inflow space 40C from flowing in from an end portion on the second detection space 62C side, and it becomes easy to inhibit gas flowing into the inflow space 40C from coming into contact with the heat detection unit 110C. In addition, at the time of assembly of the fire detection apparatus 1C, positioning of the first cover portion 150C is facilitated, and thus it is possible to rapidly and accurately perform assembly work.

According to such a configuration of the first cover portion 150C, it is possible to inhibit gas flowing into the inflow space 40C from coming into contact with the heat detection unit 110C, and it is possible to maintain or improve detection accuracy of the second detection target. In particular, since the first detection target is smoke, and the second detection target is heat, it is possible to inhibit gas containing smoke from coming into contact with the heat detection unit 110C, and it is possible to maintain or improve heat detection accuracy.

(Configuration—Details of Configuration of Detector Cover)

Figure 14:
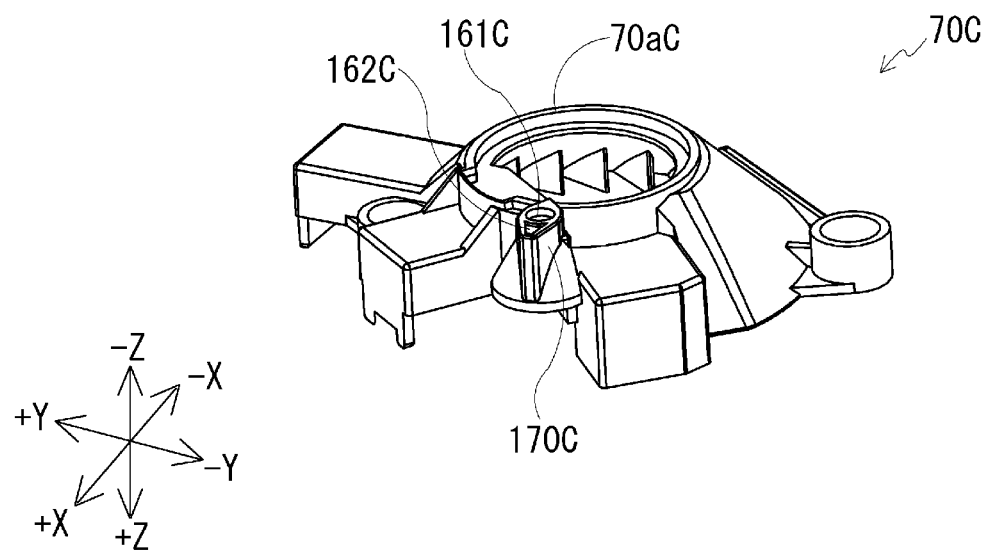
FIG. 14 is a perspective view illustrating a detector cover.

Returning to FIG. 2, next, a description will be given of details of the configuration of the detector cover 70C. FIG. 14 is a perspective view illustrating the detector cover 70C. However, the detector cover 70C may be manufactured in an arbitrary shape using an arbitrary method and material, unless otherwise specified.

In Embodiment 3, as illustrated in FIG. 12 and FIG. 14, the insertion hole 161C, the insertion hole 162C, and the second cover portion 170C are provided in the detector cover 70C.

(Configuration—Details of Configuration of Detector Cover—Insertion Hole)

The insertion hole 161C is a through-hole for inserting a part of the heat detection unit 110C into the second detection space 62C, and is provided in a portion corresponding to the insertion hole 141C in a lower side portion of the detector cover 70C as illustrated in FIG. 12 and FIG. 14. In addition, the insertion hole 162C is a through-hole for irradiating display light from the display unit to the outside of the fire detection apparatus 1C, and is provided in a portion corresponding to the insertion hole 142C in the lower side portion of the detector cover 70C as illustrated in FIG. 14.

(Configuration—Details of Configuration of Detector Cover—Second Cover Portion)

The second cover portion 170C is a cover unit that covers at least a part of a periphery of the heat detection unit 110C so that gas flowing into the inflow space 40C can be inhibited from coming into contact with the heat detection unit 110C. As illustrated in FIG. 12 and FIG. 14, the second cover portion 170C is provided to protrude downward from the lower side portion of the second cover portion 170C on the outside of the second cover portion 170C.

In addition, a specific configuration of the second cover portion 170C is arbitrary. In Embodiment 3, the second cover portion 170C is configured to surround at least a part of a periphery of a portion of the heat detection unit 110C located inside the inner cover 30C (specifically, a portion other than the first detection space 61C on the inside of the inner cover 30C) (hereinafter referred to as a "second portion").

Specifically, first, as illustrated in FIG. 12 and FIG. 14, the second cover portion 170C is formed from a tubular body (for example, a cylindrical body, a square tubular body, etc.) into which the heat detection unit 110C can be inserted, and is disposed such that the entire outer periphery of each of the insertion hole 141C, the insertion hole 161C, and the second portion of the heat detection unit 110C is covered by the second cover portion 170C. In this case, an inner diameter of the second cover portion 170C is arbitrary. For example, as illustrated in FIG. 12, by setting an inner diameter on a proximal end side of the heat detection unit 110C in inner diameters of the second cover portion 170C (in FIG. 12, an inner diameter on an upper side of the second cover portion 170C) to be larger than the other inner diameter, it is possible to increase insertability of the heat detection unit 110C into the second cover portion 170C, and a size reduction of the second cover portion 170C may be facilitated. In this way, it is possible to simply configure the second cover portion 170C, and to improve manufacturability of the second cover portion 170C.

In addition, the second cover portion 170C is configured to be able to be fit to the first cover portion 150C. More specifically, as illustrated in FIG. 12 and FIG. 14, the vertical length of the second cover portion 170C is set to be slightly shorter than (or substantially the same as) a vertical length of the inner cover 30C. In addition, a fitting portion (not illustrated) is provided in any one of an upper end portion of the first cover portion 150C or a lower end portion of the second cover portion 170C, a fit portion (not illustrated) is provided in the other one of the upper end portion of the first cover portion 150C or the lower end portion of the second cover portion 170C, and the second cover portion 170C is disposed such that the fit portion is fit by the fitting portion. In this way, it is possible to inhibit gas flowing into the inflow space 40C from flowing into a boundary between the first cover portion 150C and the second cover portion 170C, and it becomes easy to inhibit gas flowing into the inflow space 40C from coming into contact with the heat detection unit 110C. In addition, at the time of assembly of the fire detection apparatus 1C, positioning of the second cover portion 170C is facilitated, and thus it is possible to rapidly and accurately perform assembly work.

According to such a configuration of the second cover portion 170C, it is possible to inhibit gas flowing into the inflow space 40C from coming into contact with the heat detection unit 110C, and it is possible to maintain or improve detection accuracy of the second detection target.

A method of forming the first cover portion 150C and the second cover portion 170C is arbitrary. In Embodiment 3, as illustrated in FIG. 12 to FIG. 14, the first cover portion 150C and the second cover portion 170C are separately formed. However, the invention is not limited thereto. For example, the first cover portion 150C, the second cover portion 170C, and the detector cover 70C (or the inner cover 30C) may be integrally formed by injection-molding of a resin material having a light shielding property.

(With Regard to Action of Fire Detection Apparatus)

Next, a description will be given of an action of the fire detection apparatus 1C configured as described above.

That is, for example, when gas present outside the fire detection apparatus 1C flows into the inflow space 40C in a state in which the fire detection apparatus 1C is attached to the installation surface 2C, the gas that has flowed in is inhibited from coming into contact with the heat detection unit 110C (specifically, the first portion) by the first cover portion 150C. Therefore, it is possible to inhibit gas flowing into the inflow space 40C from coming into contact with the heat detection unit 110C.

In addition, when gas present outside the fire detection apparatus 1C flows into the inner cover 30C through the first opening 30aC after flowing into the inflow space 40C, the gas that has flowed in is inhibited from coming into contact with the heat detection unit 110C (specifically, the second portion) by the second cover portion 170C. Therefore, it is possible to inhibit gas flowing into the inflow space 40C from coming into contact with the heat detection unit 110C.

Effect of Embodiment 3

As described above, according to Embodiment 3, since the first detection space 61C located inside the housing, the second detection space 62C located outside the housing, the inflow space 40C located inside the housing to allow gas containing the first detection target to flow into the first detection space 61C from the outside the housing, the heat detection unit 110C for detecting the second detection target provided such that at least a part of the heat detection unit 110C is accommodated in the second detection space 62C, and the first cover portion 150C and the second cover portion 170C for covering at least a part of the periphery of the heat detection unit 110C so that gas flowing into the inflow space 40C can be inhibited from coming into contact with the heat detection unit 110C are included, it is possible to inhibit gas flowing into the inflow space 40C from coming into contact with the heat detection unit 110C, and it is possible to maintain or improve detection accuracy of the second detection target.

In addition, since each of the first cover portion 150C and the second cover portion 170C is formed from a tubular body into which the heat detection unit 110C can be inserted, it is possible to simply configure the first cover portion 150C and the second cover portion 170C, and it is possible to improve manufacturability of the first cover portion 150C and the second cover portion 170C.

In addition, since the inner diameter on the proximal end side of the heat detection unit 110C in inner diameters of the second cover portion 170C is set to be larger than the other inner diameter, it is possible to increase insertability of the heat detection unit 110C into the second cover portion 170C, and a size reduction of the second cover portion 170C is facilitated.

In addition, since the inner diameter of at least the part of the first cover portion 150C is set to be substantially the same as the outer diameter of the portion of the heat detection unit 110C inserted into the first cover portion 150C (specifically, the outer diameter of the cross section of the first portion along the X-Y plane), it becomes easy to inhibit gas flowing into the inflow space 40C from coming into contact with the heat detection unit 110C, and it becomes easy to maintain detection accuracy of the second detection target.

In addition, since the insertion hole 120C for inserting the heat detection unit 110C into the second detection space 62C is provided in the top surface portion 22C facing the second detection space 62C in the side portion of the housing, and the insertion hole 120C and the first cover portion 150C are configured such that the end portion of the first cover portion 150C on the second detection space 62C side can be fit to the top surface portion 22C through the insertion hole 120C, it is possible to inhibit gas flowing into the inflow space 40C from flowing in from the end portion on the second detection space 62C side, and it becomes more easy to inhibit gas flowing into the inflow space 40C from coming into contact with the heat detection unit 110C. In addition, at the time of assembly of the fire detection apparatus 1C, positioning of the first cover portion 150C is facilitated, and thus it is possible to rapidly and accurately perform assembly work.

In addition, since the first detection target is smoke and the second detection target is heat, contact of gas containing smoke with the heat sensing unit 110C can be suppressed, and heat detection accuracy can be maintained or improved.

[III] MODIFICATIONS TO EMBODIMENTS

Even though Embodiment 1 to Embodiment 3 according to the invention have been described above, a specific configuration and means of the invention can be arbitrarily modified and improved within a range of a technical idea of each invention described in the claims. Hereinafter, such a modification will be described.

Modifications to Embodiment 1

First, modifications of Embodiment 1 will be described.
(With Regard to Problem to be Solved and Effect of Invention)

First, a problem to be solved by the invention and effect of invention are not limited to the above contents, and may differ in accordance with details of an implementation environment or a configuration of the invention. Only some of the above-mentioned problems may be solved, or only some of the above-mentioned effects may be achieved in some cases.

(With Regard to Fire Detection Apparatus)

Embodiment 1 describes that the fire detection apparatus 1A includes the inner cover 30A. However, the invention is not limited thereto. For example, the inner cover 30A may be omitted.

(With Regard to Insertion Hole)

Embodiment 1 describes that the insertion hole 120A is formed in a portion other than the central portion in the part of the top surface portion 22A. However, the invention is not limited thereto. For example, the insertion hole 120A may be formed in the central portion of the top surface portion 22A.

(With Regard to Guard Portion)

Embodiment 1 describes that the number of installed ribs of the guard portion 130A is four. However, the invention is not limited thereto. For example, the number may be only two or only three, or may be five or more.

In addition, Embodiment 1 describes that a material of some ribs among a plurality of ribs is made different from a material of some other ribs, and a shape of some ribs among the plurality of ribs is made different from a shape of some other ribs. However, the invention is not limited thereto. For example, a material of some ribs among the plurality of ribs may be made different from a material of some other ribs, and respective shapes of the plurality of ribs may be the same. Alternatively, respective materials of the plurality of ribs may be the same, and a shape of some ribs among the plurality of ribs may be made different from a shape of some other ribs.

In addition, Embodiment 1 describes that only the first guard side rib 131A is formed of the translucent material. However, the invention is not limited thereto. For example, a rib other than the first guard side rib 131A may be formed of the translucent material. As an example, at least one of the second guard side rib 132A, the third guard side rib 133A, or the fourth guard side rib 134A may be formed of the translucent material. Alternatively, only two or only three of the first guard side rib 131A, the second guard side rib 132A, the third guard side rib 133A, or the fourth guard side rib 134A may be formed of the translucent material.

In addition, Embodiment 1 describes that the thicknesses of the first guard side rib 131A, the second guard side rib 132A, the third guard side rib 133A, and the fourth guard side rib 134A are set on the basis of the inflow or the inflow direction of the air flow flowing into the guard portion 130A. However, the invention is not limited thereto. For example, the thicknesses may be set on the basis of a parameter other than the inflow and the inflow direction of the air flow (for example, a length of a rib installation interval).

Embodiment 1 describes that the first guard side rib 131A is the thickest rib. However, the invention is not limited thereto. For example, the first guard side rib 131A may be a rib thinner than the thickest rib.

In addition, Embodiment 1 describes that the second guard side rib 132A is the thinnest rib and the narrowest rib. However, the invention is not limited thereto. For example, the second guard side rib 132A may be either the thinnest rib or the narrowest rib. Alternatively, the second guard side rib 132A may be a rib thicker than the thinnest rib and wider than the narrowest rib.

Modifications to Embodiment 2

Next, modifications of Embodiment 2 will be described.
(With Regard to Problem to be Solved and Effect of Invention)

First, a problem to be solved by the invention and effect of invention are not limited to the above contents, and may differ in accordance with details of an implementation environment or a configuration of the invention. Only some of the above-mentioned problems may be solved, or only some of the above-mentioned effects may be achieved in some cases.

(With Regard to Fire Detection Apparatus)

Embodiment 2 describes that the fire detection apparatus 1B includes the inner cover 30B. However, the invention is not limited thereto. For example, the inner cover 30B may be omitted. In this case, the first partition wall 150B and the second partition wall 160B may be provided inside the outer cover 20B.

In addition, Embodiment 2 describes that the fire detection apparatus 1B includes the carbon monoxide detection unit. However, the invention is not limited thereto. For example, the carbon monoxide detection unit may be omitted. In this case, the first partition wall 150B may be omitted.

(With Regard to Heat Detection Space)

Embodiment 2 describes that the heat detection space 62B is located outside the outer cover 20B. However, the invention is not limited thereto. For example, the heat detection space 62B may be located inside the outer cover 20B. As an example, the heat detection space 62B may be located between the top surface portion 22B of the outer cover 20B and the inner cover 30B.

In addition, Embodiment 2 describes that the carbon monoxide detection unit is provided at a position close to the inflow hole 30bB. However, the invention is not limited thereto. For example, the carbon monoxide detection unit may be provided at a position separated from the inflow hole 30bB. As an example, the carbon monoxide detection unit may be provided at a position close to the insertion hole 120B.

(With Regard to Inner Cover)

Embodiment 2 describes that one inflow hole 30bB is provided in the lower side portion of the inner cover 30B. However, the invention is not limited thereto. For example, a plurality of inflow holes 30bB may be provided at a portion facing the carbon monoxide detection space 61B in the lower side portion of the inner cover 30B.

(With Regard to Partition Wall)

Embodiment 2 describes that the first partition wall 150B is configured to surround only the part of the periphery of the carbon monoxide detection unit and the inflow hole 30bB in the carbon monoxide detection space 61B. However, the invention is not limited thereto. For example, the first partition wall 150B may be configured to surround the entire periphery of the carbon monoxide detection unit and the inflow hole 30bB.

In addition, Embodiment 2 describes that the entire periphery of the heat detection unit 110B, the insertion hole 120B, and the insertion hole 140aB in the inflow space 40B is surrounded. However, the invention is not limited thereto. For example, only a part of the periphery of the heat detection unit 110B, the insertion hole 120B, and the insertion hole 140aB may be surrounded.

In addition, Embodiment 2 describes that the first partition wall 150B and the second partition wall 160B are provided. However, the invention is not limited thereto. For example, when heat detection accuracy can be maintained, any one of the first partition wall 150B or the second partition wall 160B may be omitted.

Modifications to Embodiment 3

Next, modifications of Embodiment 3 will be described.
(With Regard to Problem to be Solved and Effect of Invention)

First, a problem to be solved by the invention and effect of invention are not limited to the above contents, and may differ in accordance with details of an implementation environment or a configuration of the invention. Only some of the above-mentioned problems may be solved, or only some of the above-mentioned effects may be achieved in some cases.

(With Regard to First Detection Target and Second Detection Target)

Embodiment 3 describes that the first detection target is smoke. However, the invention is not limited thereto. For example, the first detection target may be carbon monoxide. In this case, instead of the first light emitting unit, the second light emitting unit, and the light receiving unit, a carbon monoxide detection unit that detects carbon monoxide is provided inside the housing. In addition, the first detection target may be smoke and carbon monoxide. In this case, instead of the first light emitting unit, the second light emitting unit, and the light receiving unit, the carbon monoxide detection unit is provided inside the housing.

In addition, Embodiment 3 describes that the second detection target is heat. However, the invention is not limited thereto. For example, the second detection target may be smoke or carbon monoxide. In this case, the first light emitting unit, the second light emitting unit, and the light receiving unit, or the carbon monoxide detection unit is provided in the second detection space 62C.

(With Regard to Fire Detection Apparatus)

Embodiment 3 describes that the fire detection apparatus 1C includes the inner cover 30C. However, the invention is not limited thereto. For example, the inner cover 30C may be omitted. In this case, the first cover portion 150C and the second cover portion 170C may be provided inside the outer cover 20C.

(With Regard to Heat Detection Unit)

Embodiment 3 describes that only a part of the heat detection unit 110C is accommodated in the second detection space 62C. However, the invention is not limited thereto. For example, the entire heat detection unit 110C may be accommodated.

(With Regard to Second Detection Space)

Embodiment 3 describes that the second detection space 62C is provided outside the housing. However, the invention is not limited thereto. For example, the second detection space 62C may be provided inside the housing.

(With Regard to First Cover Portion and Second Cover Portion)

Embodiment 3 describes that the inner diameter on the proximal end side of the heat detection unit 110C in the inner diameters of the second cover portion 170C is set to be larger than the other inner diameter. However, the invention is not limited thereto. For example, the inner diameters of the second cover portion 170C may be set to be uniform.

In addition, Embodiment 3 describes that the first cover portion 150C is configured to cover the entire outer periphery of each of the insertion hole 120C, the insertion hole 141C, and the first portion of the heat detection unit 110C. However, the invention is not limited thereto, and the first cover portion 150C may be configured to cover only a part of the outer periphery. In addition, Embodiment 3 describes that the second cover portion 170C is configured to cover the entire outer periphery of each of the insertion hole 141C, the insertion hole 161C, and the second portion of the heat detection unit 110C. However, the invention is not limited thereto, and the second cover portion 170C may be configured to cover only a part of the outer periphery.

In addition, Embodiment 3 describes that the first cover portion 150C and the insertion hole 120C are configured such that the end portion of the first cover portion 150C on the second detection space 62C side is fit to the top surface portion 22C through the insertion hole 120C. However, the invention is not limited thereto. For example, the first cover portion 150C and the insertion hole 120C may be configured such that the end portion of the first cover portion 150C on the second detection space 62C side may not be fit to the top surface portion 22C through the insertion hole 120C. In addition, Embodiment 3 describes that the second cover portion 170C is configured to be able to be fit to the first cover portion 150C. However, the invention is not limited thereto. For example, fitting to the second cover portion 170C may not be allowed.

One embodiment of the present invention provides a fire detection apparatus comprises a housing; and a unit that detects the fire on an inside of the housing.

According to this embodiment, since a unit for detecting a fire is provided inside the housing, a fire can be detected inside the housing, and the presence or absence of the occurrence of a fire can be detected effectively.

Another embodiment of the present invention provides the alarm apparatus according to the above embodiment, the fire detection apparatus being attached to an installation surface of an installation object, the fire detection apparatus comprising: a heat detection unit that detects the fire, a part of the heat detection unit being accommodated in the inside of the housing, the heat detection unit being configured such that another part of the heat detection unit is exposed to an outside of the fire detection apparatus through an insertion hole formed in an opposite side portion corresponding to a side portion on an opposite side from a side portion on a side of the installation surface in side portions of the housing; and a guard unit provided to cover a periphery of the insertion hole and another part of the heat detection unit in the opposite side portion, the guard unit having a plurality of ribs, wherein a material of some ribs among the plurality of ribs is made different from a material of some other ribs, or a shape of some ribs among the plurality of ribs is made different from a shape of some other ribs.

According to this embodiment, since the material of some ribs among the plurality of ribs is made different from the material of some other ribs, for example, it is possible to guide light irradiated from the display unit accommodated in the housing to the outside of the fire detection apparatus through the some ribs and the insertion hole by forming only the some ribs using the translucent material. Therefore, since there is no need to provide the display hole for guiding light irradiated from the display unit to the outside in the housing, it is possible to maintain the design property of the fire detection apparatus when compared to a conventional technology (a technology in which the protector and the display hole are exposed to the outside). In addition, since the shape of some ribs among the plurality of ribs is made different from the shape of some other ribs, when compared to a case in which the plurality of ribs is formed in the same shape, it is easy to uniformize the inflow of the air flow flowing into the housing from each direction in accordance with the installation state of the fire detection apparatus. Therefore, it is possible to improve the inflow property of the air flow in the fire detection apparatus.

Another embodiment of the present invention provides the alarm apparatus according to the above embodiment, wherein further comprising: a display unit provided on the inside of the housing, the display unit displaying predetermined information by irradiating light toward the outside of the fire detection apparatus through the insertion hole, wherein the some ribs are formed using a translucent material, and the plurality of ribs is configured such that light irradiated from the display unit is guided to the outside of the fire detection apparatus through the ribs formed using the translucent material.

According to this embodiment, since the some ribs are formed using a translucent material, and the plurality of ribs is configured such that light irradiated from the display unit is guided to the outside of the fire detection apparatus through the ribs formed using the translucent material, the some of the ribs of the guard unit may be allowed to function as the light guide while ensuring the strength of the guard unit, and light irradiated from the display unit can be easily visually recognized in various directions.

Another embodiment of the present invention provides the alarm apparatus according to the above embodiment, wherein thicknesses of the plurality of ribs are set on the basis of an inflow or an inflow direction of an air flow flowing into the guard unit.

According to this embodiment, since thicknesses of the plurality of ribs are set on the basis of an inflow or an inflow direction of an air flow flowing into the guard unit, it is possible to set the thicknesses of the plurality of ribs based on the inflow or the inflow direction of the air flow flowing into the guard unit, and it is possible to ensure the inflow property of the air flow to the guard unit while maintaining the durability of the guard unit.

Another embodiment of the present invention provides the alarm apparatus according to the above embodiment, wherein the ribs formed using the translucent material are ribs thicker than a thinnest rib among the plurality of ribs.

According to this embodiment, since the ribs formed using the translucent material are ribs thicker than a thinnest rib among the plurality of ribs, light irradiated from the display unit is easily guided to the outside of the fire detection apparatus while suppressing damage to the ribs formed using the translucent material. Thus, it is possible to further maintain the display function of the fire detection apparatus while improving durability of the ribs formed using the translucent material.

Another embodiment of the present invention provides the alarm apparatus according to the above embodiment, wherein the insertion hole is provided in a portion other than a central portion in a portion of the opposite side portion.

According to this embodiment, since the insertion hole is provided in a portion other than a central portion in a portion of the opposite side portion, when compared to the case in which the insertion hole is formed in the central portion of the opposite side portion, there are few restrictions on attachment of the heat detection unit and the display unit. Therefore, it is possible to maintain an attachment property of the heat detection unit and the display unit.

Another embodiment of the present invention provides the alarm apparatus according to the above embodiment, wherein a rib on a side of the central portion of the opposite side portion among the plurality of ribs is a rib thinner than a thickest rib among the plurality of ribs or a rib narrower than a widest rib.

According to this embodiment, since a rib on a side of the central portion of the opposite side portion among the plurality of ribs is a rib thinner than a thickest rib among the plurality of ribs or a rib narrower than a widest rib, when the insertion hole is provided in a portion other than the central portion of the opposite side portion, it becomes easier to uniformize the inflow of the air flow flowing in from each direction in the guard unit. Thus, it is possible to improve the inflow property of the air flow to the guard unit.

Another embodiment of the present invention provides the alarm apparatus according to the above embodiment, further comprising: a first detection space for performing detection of a first detection target contained in a gas flowing in from an outside of the housing on the inside of the housing; a second detection space located on the inside or the outside of the housing, the second detection space being provided to perform detection of a second detection target; and a partition wall provided in the housing, the partition wall being provided to partition the first detection space or the second detection space so that inhibiting the gas flowing into the first detection space from flowing out to the second detection space is allowed.

According to this embodiment, since a first detection space for performing detection of a first detection target contained in a gas flowing in from an outside of the housing on the inside of the housing, a second detection space located on the outside of the housing, the second detection space being provided to perform detection of a second detection target, and a partition wall provided in the housing, the partition wall being provided to partition the first detection space or the second detection space so that inhibiting the gas flowing into the first detection space from flowing out to the second detection space is allowed are included, it is possible to inhibit gas flowing into the first detection space from flowing out to the second detection space. Therefore, when compared to a case in which the partition wall is not provided, it is possible to prevent detection of the second detection target by the detection unit from being inhibited by the gas that has flowed in, and it is possible to maintain or improve detection accuracy of the second detection target.

Another embodiment of the present invention provides the alarm apparatus according to the above embodiment, wherein the first detection space includes a first detection space body in which detection of the first detection target is performed, and an inflow space for allowing the gas containing the first detection target to flow into the first detection space body, the fire detection apparatus further comprises an insertion hole provided in a portion facing the inflow space in a portion of the housing to insert a part of a second detection target detecting unit that detects the second detection target accommodated in the housing, into the second detection space, and the partition wall is configured to surround at least a part of a periphery of the second detection target detecting unit and the insert hole in the inflow space.

According to this embodiment, since an insertion hole provided in a portion facing the inflow space in a portion of the housing to insert a part of a second detection target detecting unit into the second detection space is included, and the partition wall is configured to surround at least a part of a periphery of the second detection target detecting unit and the insert hole in the inflow space, it is possible to effectively inhibit gas flowing into the inflow space from flowing out to the second detection space through the insertion hole, and detection accuracy of the second detection target is easily maintained.

Another embodiment of the present invention provides the alarm apparatus according to the above embodiment, further comprising: an inflow hole provided in the housing to allow the gas containing the first detection target to flow into the first detection space; and a first detection target detecting unit that detects the first detection target, the first detection target detecting unit being accommodated in the first detection space, wherein the partition wall is configured to surround at least a part of a periphery of the first detection target detecting unit and the inflow hole in the first detection space.

According to this embodiment, since an inflow hole provided in the housing and a first detection target detecting unit that detects the first detection target are included, and the partition wall is configured to surround at least a part of a periphery of the first detection target detecting unit and the inflow hole in the first detection space, it is possible to effectively inhibit gas flowing into the first detection space from flowing out to the second detection space through the inflow hole, and detection accuracy of the second detection target is easily maintained.

Another embodiment of the present invention provides the alarm apparatus according to the above embodiment, wherein the housing and the partition wall are mutually integrally formed.

According to this embodiment, since the housing and the partition wall are mutually integrally formed, when compared to a case in which the housing is separately formed from the partition wall, it is possible to save time and effort to attach the partition wall to the housing, and to improve manufacturability of the fire detection apparatus. In addition, it is possible to reduce the number of parts of the fire detection apparatus, and to reduce an environmental load accompanying manufacture of the fire detection apparatus.

Another embodiment of the present invention provides the alarm apparatus according to the above embodiment, wherein the first detection target is smoke or carbon monoxide, and the second detection target is heat.

Another embodiment of the present invention provides the alarm apparatus according to the above embodiment, further comprising: a first detection space located on the inside of the housing to perform detection of a first detection target; a second detection space located on the inside or an outside of the housing to perform detection of a second detection target; an inflow space located on the inside of the housing to allow gas containing the first detection target to flow into the first detection space from the outside of the housing; a detection unit that detects the second detection target, the detection unit being provided such that at least a part of the detection unit is accommodated in the second detection space; and a cover unit that covers at least a part of a periphery of the detection unit such that inhibiting the gas flowing into the inflow space from coming into contact with the detection unit is allowed.

According to this embodiment, since a first detection space located on the inside of the housing, a second detection space located on the inside or an outside of the housing, an inflow space located on the inside of the housing to allow gas containing the first detection target to flow into the first detection space from the outside of the housing, a detection unit that detects the second detection target, the detection unit being provided such that at least a part of the detection unit is accommodated in the second detection space, and a cover unit that covers at least a part of a periphery of the detection unit such that inhibiting the gas flowing into the inflow space from coming into contact with the detection unit is allowed are included, it is possible to inhibit gas flowing into the inflow space from coming into contact with the detection unit, and it is possible to maintain or improve detection accuracy of the second detection target.

Another embodiment of the present invention provides the alarm apparatus according to the above embodiment, wherein the cover unit is formed from a tubular body into which the detection unit is allowed to be inserted.

According to this embodiment, since the cover unit is formed from a tubular body into which the detection unit is allowed to be inserted, it is possible to simply configure the cover unit, and it is possible to improve manufacturability of the cover unit.

Another embodiment of the present invention provides the alarm apparatus according to the above embodiment, wherein an inner diameter on a proximal end side of the detection unit in inner diameters of the cover unit is set to be larger than the other inner diameter.

According to this embodiment, since an inner diameter on a proximal end side of the detection unit in inner diameters of the cover unit is set to be larger than the other inner diameter, it is possible to increase insertability of the detection unit into the cover unit, and a size reduction of the cover unit is facilitated.

Another embodiment of the present invention provides the alarm apparatus according to the above embodiment, wherein an inner diameter of at least a part of the cover unit is set to be substantially the same as an outer diameter of a portion of the detection unit inserted into the cover unit.

According to this embodiment, since an inner diameter of at least a part of the cover unit is set to be substantially the same as an outer diameter of a portion of the detection unit inserted into the cover unit, it becomes easy to inhibit gas flowing into the inflow space from coming into contact with the detection unit, and it becomes easy to maintain detection accuracy of the second detection target.

Another embodiment of the present invention provides the alarm apparatus according to the above embodiment, wherein an insertion hole for inserting the detection unit into the second detection space is provided in a facing side portion facing the second detection space in a side portion of the housing, and the insertion hole and the cover unit are configured to allow an end portion of the cover unit on a side of the second detection space to be fit to the facing side portion through the insertion hole.

According to this embodiment, since an insertion hole for inserting the detection unit into the second detection space is provided in a facing side portion facing the second detection space in a side portion of the housing, and the insertion hole and the cover unit are configured to allow an end portion of the cover unit on a side of the second detection space to be fit to the facing side portion through the insertion hole, it is possible to inhibit gas flowing into the inflow space from flowing in from the end portion on the second detection space side, and it becomes more easy to inhibit gas flowing into the inflow space from coming into contact with the detection unit. In addition, at the time of assembly of the fire detection apparatus, positioning of the cover unit is facilitated, and thus it is possible to rapidly and accurately perform assembly work.

Another embodiment of the present invention provides the alarm apparatus according to the above embodiment, wherein the first detection target is smoke or carbon monoxide, and the second detection target is heat.

According to this embodiment, since the first detection target is smoke or carbon monoxide, and the second detection target is heat, contact of gas containing smoke with the sensing unit can be suppressed, and heat detection accuracy can be maintained or improved.

REFERENCE SIGNS LIST

1A Fire detection apparatus
2A Installation surface
10A Attachment base
20A Outer cover
21A Outer cover body
22A Top surface portion
23A First rib portion
24A Second rib portion
30A Inner cover
30aA First opening
40A Inflow space
50A Insect screen
60A Detection space
70A Detector cover
70aA Second opening
80A Detector body
81A Base
90A Terminal board
91A Attachment member
100A Substrate
104aA Light guide
110A Heat detection unit
120A Insertion hole
130A Guard portion
131A First guard side rib
132A second guard side rib
133A Third guard side rib
134A Fourth guard side rib
135A Guard side connecting portion
DA Predetermined distance
H1A Height of ceiling portion
H2A Height of eyes of person
HMA Person
1B Fire detection apparatus
2B Installation surface
10B Attachment base
20B Outer cover
21B Outer cover body
22B Top surface portion
23B First rib portion
24B Second rib portion
30B Inner cover
30aB First opening
30bB Inflow hole
40B Inflow space
50B Insect screen
61B Carbon monoxide detection space
62B Heat detection space
63B Smoke detection space
70B Detector cover
70aB Second opening
80B Detector body
90B Terminal board
91B Attachment member
91aB First attachment hole
91bB Second attachment hole
100B Substrate
110B Heat detection unit
120B Insertion hole
130B Guard portion
131B Guard side rib
140aB Insertion hole
140bB Insertion hole
150B First partition wall
160B Second partition wall
1C Fire detection apparatus
2C Installation surface
10C Attachment base
20C Outer cover
21C Outer cover body
22C Top surface portion
23C First rib portion
24C Second rib portion
30C Inner cover
30aC First opening
40C Inflow space
50C Insect screen
61C First detection space
62C Second detection space
70C Detector cover
70aC Second opening
80C Detector body
90C Terminal board
91C Attachment member
91aC First attachment hole
91bC Second attachment hole
100C Substrate
110C Heat detection unit
120C Insertion hole
130C Guard portion
131C Guard side rib
141C Insertion hole
142C Insertion hole
150C First cover portion
161C Insertion hole
162C Insertion hole
170C Second cover portion

The invention claimed is:

1. A fire detection apparatus for detecting a fire in a monitored area, the fire detection apparatus being attached to an installation surface of an installation object, the fire detection apparatus comprising:
a housing; and
a heat detection unit that detects the fire on an inside of the housing,
a part of the heat detection unit being accommodated in the inside of the housing, the heat detection unit being configured such that another part of the heat detection unit is exposed to an outside of the fire detection apparatus through an insertion hole formed in an opposite side portion corresponding to a side portion on an opposite side from a side portion on a side of the installation surface in side portions of the housing; and
a guard unit provided to cover a periphery of the insertion hole and another part of the heat detection unit in the opposite side portion, the guard unit having a plurality of ribs,
wherein a material of some ribs among the plurality of ribs is made different from a material of some other ribs, or a shape of some ribs among the plurality of ribs is made different from a shape of some other ribs.

2. The fire detection apparatus according to claim 1, further comprising:
- a display unit provided on the inside of the housing, the display unit displaying predetermined information by irradiating light toward the outside of the fire detection apparatus through the insertion hole,
- wherein the some ribs are formed using a translucent material, and
- the plurality of ribs is configured such that light irradiated from the display unit is guided to the outside of the fire detection apparatus through the ribs formed using the translucent material.

3. The fire detection apparatus according to claim 1, wherein thicknesses of the plurality of ribs are set on the basis of an inflow or an inflow direction of an air flow flowing into the guard unit.

4. The fire detection apparatus according to claim 1, wherein the ribs formed using the translucent material are ribs thicker than a thinnest rib among the plurality of ribs.

5. The fire detection apparatus according to claim 1, wherein the insertion hole is provided in a portion other than a central portion in a portion of the opposite side portion.

6. The fire detection apparatus according to claim 5, wherein a rib on a side of the central portion of the opposite side portion among the plurality of ribs is a rib thinner than a thickest rib among the plurality of ribs or a rib narrower than a widest rib.

\* \* \* \* \*